(12) United States Patent
Sealand et al.

(10) Patent No.: US 7,430,555 B2
(45) Date of Patent: Sep. 30, 2008

(54) SYSTEM AND METHOD FOR TRANSACTING RETRIEVAL OF REAL ESTATE PROPERTY LISTINGS USING A REMOTE CLIENT INTERFACED OVER AN INFORMATION NETWORK

(75) Inventors: Michael D. Sealand, Boulder Creek, CA (US); Gabriel Gross, Redwood City, CA (US); Joseph Mizrahi, Los Altos, CA (US)

(73) Assignee: BayNet World, Inc., Cupertino, CA (US)

( * ) Notice: Subject to any disclaimer, the term of this patent is extended or adjusted under 35 U.S.C. 154(b) by 69 days.

(21) Appl. No.: 10/243,259

(22) Filed: Sep. 12, 2002

(65) Prior Publication Data
US 2003/0014402 A1 Jan. 16, 2003

Related U.S. Application Data

(63) Continuation of application No. 09/344,389, filed on Jun. 25, 1999, now Pat. No. 6,484,176.

(51) Int. Cl.
G06F 17/00 (2006.01)
(52) U.S. Cl. .................... 707/100; 707/102; 707/104.1; 707/200
(58) Field of Classification Search .................. 707/10, 707/100, 104.1
See application file for complete search history.

(56) References Cited

U.S. PATENT DOCUMENTS

| | | | |
|---|---|---|---|
| 5,189,632 A | 2/1993 | Paajanen et al. | |
| 5,452,356 A | 9/1995 | Albert | |
| 5,475,375 A * | 12/1995 | Barrett et al. | 340/5.25 |
| 5,584,025 A * | 12/1996 | Keithley et al. | 707/104.1 |
| 5,764,731 A | 6/1998 | Yablon et al. | |
| 5,781,773 A * | 7/1998 | Vanderpool et al. | 707/100 |
| 5,944,769 A | 8/1999 | Musk et al. | |
| 5,956,716 A | 9/1999 | Kenner et al. | |
| 5,978,833 A * | 11/1999 | Pashley et al. | 709/200 |
| 6,519,241 B1 | 2/2003 | Theimer | |
| 6,594,633 B1 * | 7/2003 | Broerman | 705/1 |

(Continued)

OTHER PUBLICATIONS

URL Website "www.newmls.com", Apr. 29, 1999, entier website.*

(Continued)

*Primary Examiner*—Sana Al-Hashemi
(74) *Attorney, Agent, or Firm*—Patrick J. S. Inouye; Scott E. Smith

(57) ABSTRACT

A system and method for transacting retrieval of real estate property listings using a remote client interfaced over an information network is described. A set of real estate property listings is maintained in a structured database. Each listing includes a characteristics set describing property listing information organized according to property class. A remote client is interfaced in a dynamic search session via a communications link transiently connected over an information network. The remote client maintains both program code and data exclusively in a general purpose random access memory configured for both transient and persistent storage. A target characteristics set describing one or more such listings in at least one such property class is received from the remote client upon initiation of the session. The listings matching the target characteristics set from the structured database are identified. The listings are provided to the remote client upon termination of the session.

49 Claims, 21 Drawing Sheets

U.S. PATENT DOCUMENTS 6,597,983 B2 * 7/2003 Hancock ..................... 701/200

OTHER PUBLICATIONS

URL Website "www.ushx.com", Apr. 22, 1999, entier website.*
Wyldfyre Technologies, inc., leading the way in Real Estate GUI Software; Real Innovators, pp. 18-20.*
"1999 Nokia Mobile Phones," (1999).
"Nokia 9110 Communicator," http://www.nokia.com/phones/9110/index.html, (1999).
"Nokia 9000 Communicator User's Manual," Nokia Mobile Phones, (1996).
"Intel Delivers Enabling Technology For New Nokia 9000 Communicator," http://www.intel.com/design/news/webnwsar.htm, (2000).
Carol De Giere, "HP OmniGo 700LX, Imported To The USA By Data Critical, Is Now Available In Selected Locations Under A New Name 'HVO1000,'" http://www.datacritical.com, Data Critical Corporation, OK, USA.
"HP OmniGo 700LX Communicator Plus," http://www.rundel-d.com/palmtop/datasheets/hp700lx.htm, (2002).
B. Evans, "Supra CEO Greg Burge Discusses New Lockbox Competition," Real Estate News And Advertisement, (2003).
Junko Yoshida, "From CeBIT: Nokia Rolls Mobile Phone/Organizer," (1996), http://www.eetimes.com/news/96/hr892.html, (2002).
P.Clarke, "Major Cell Phone Makers Back Psions'EPOC32 Operating System,"(1998), http://www.eetimes.com/news/98/1014news/major.html, (2002).
J. Blau, "Cellular Phones Get Data, Graphics Upgrade," (1996), http://www.totaltele.com/cwi/158news2.html, (2002).
"Nokia Pioneers New Product Category With The World's First All-In-One Communicator," (1996), Press Releases, http://press.nokia.com/PR/199603/775981_5.html, (Apr. 2002).
"Nokia Launches The Nokia 9000 Communicator For DCS 1800 Standards," (1997), Press Releases, http://press/nokia.com/PR/199703/775588_5.html, (Apr. 2002).
"Hp OmniGo 700LX Communicator Plus Provides First Truly Integrated Computing And Communications Tool For Mobile Professionals, "(1996), Press Releases, http://www.press.nokia.com/PR/199602/775873_5.html, (Oct. 2003).
"Nokia And Data Critical Form Technology Cooperation," (1996), Press Releases, http://www.nokia.com, (Sep. 2003).
"Nokia Announces Collaboration With Third Party Companies In Connection With North American Launch Of Nokia 9000i Communicator," (1997), Press Releases, http://www.nokia.com, (Sep. 2003).
"Wyldfyre Technologies, Inc., Leading the Way in Real Estate GUI Software," Real Innovators, pp. 18-20 (Summer 1997), ed.

* cited by examiner

42

45

49

51

160

170

SYSTEM AND METHOD FOR TRANSACTING RETRIEVAL OF REAL ESTATE PROPERTY LISTINGS USING A REMOTE CLIENT INTERFACED OVER AN INFORMATION NETWORK

CROSS-REFERENCE TO RELATED APPLICATIONS

This patent application is a continuation of U.S. patent application Ser. No. 09/344,389, filed Jun. 25, 1999, now U.S. Pat. No. 6,484,176 issued Nov. 19, 2002, the priority date of which is claimed and the disclosure of which is incorporated by reference.

FIELD OF THE INVENTION

The present invention relates in general to remote database access and, in particular, to a system and method for transacting retrieval of real estate property listings using a remote client interfaced over an information network.

BACKGROUND OF THE INVENTION

In the residential segment of the real estate industry, computerized real estate information databases, known as multiple listing service (MLS) databases, have become the premier source of centralized real estate property listing information. MLS databases enjoy widespread acceptance throughout the industry. Individual real estate agencies subscribe to the MLS and provide information about properties both listed and sold. Access is ordinarily restricted to licensed real estate professionals, appraisers, and lending institutions.

Typically, an MLS database contains a set of property listing records describing real estate properties being offered for sale, leasing, or rental for a defined geographic region. Each listing identifies and describes the various characteristics of the property in a standard, pre-defined format, which can be easily and accurately searched. Listings can also include maps and photographs of the property. The characteristics also include mortgage rate, pricing and tax information, including the price and terms at which a particular property sold.

One important aspect of MLS databases is the ability to archive historical information about properties already sold for use by a broad audience. For instance, to a potential seller or purchaser, historical information is crucial in determining the price at which a comparable property would sell in a particular market segment. Similarly, to an appraiser, historical information is essential in arriving at an appropriate appraisal figure. In an active real estate market, near real time historical information is almost a requirement.

Another important aspect of MLS databases is the capability of providing access to new or updated listing information. Most MLS databases are updated continuously. However, as a practical matter, real estate agents do not have continuous access to their respective MLSs. Consequently, real estate agents, and therefore, their clients, generally only learn about new or updated listings during an MLS database access session conducted at the agents' office.

One prior art approach to providing access to an MLS is through a remote terminal session. Typically, a terminal or a personal computer configured with a terminal emulator connects to the MLS database either over a dedicated line or via a dial up connection with a modem. The listing information is served in a character-based, page display format, generally consisting of a 25 by 80 character presentation space. Thus, the terminal or personal computer must provide a sufficient screen size upon which to view the listing information, one page at a time. Moreover, access to historical information and new or updated listings can only be obtained during a given access session.

A similar prior art approach to providing access to an MLS is the MLSWindows product, described in "WyldFyre Technologies, Inc., Leading the Way In Real Estate GUI Software," Real Innovators, pp. 18-20 (Summer 1997 ed.). Unlike the conventional terminal screen-based approach, the MLSWindows product provides a graphical user interface (GUI) for viewing listing information, including maps. The MLSWindows product also provides a capability to connect to an MLS database via a TCP/IP network or via synchronous or asynchronous communications. However, the MLSWindows product requires a personal computer with a windowing environment upon which to operate. Although significant progress has been made in miniaturizing portable personal computers, at best, these systems suffer from limited battery life and require a size and weight that make handheld operation impracticable.

Therefore, there is a need for a highly portable and flexible solution for remotely accessing a real estate information database in an interactive fashion. Preferably, such a solution includes a capability to automatically be notified of or inquire into new or updated listings.

There is a further need for an approach to remotely accessing a real estate information database using a portable computing device which could be standalone or integral to a portable information or communication appliance, such as a wireless communications device.

SUMMARY OF THE INVENTION

The present invention provides a system and method for transacting retrieval of real estate property listings using a remote client interfaced over an information network.

An embodiment of the present invention is a system and method for transacting retrieval of real estate property listings using a remote client interfaced over an information network. A portable computing device maintains both program code and data exclusively in a general purpose random access memory configured for both transient and persistent storage of program code and data. A database server includes a search engine configured to retrieve listing records from a real estate information database. Each listing record includes a set of characteristics describing an individual real estate property listing. A remote client defines methods in the general purpose random access memory for accessing the real estate information database through the search engine. The methods include a session manager, a search specification method, and a search results display method. The session manager facilitates a dynamic session between the portable computing device and the database server over a communications link. The session manager identifies the remote client to the database server and manages an interactive search session between the remote client and the search engine. The search specification method interactively sends to the search engine search parameters and receives from the search engine the listing records having real estate property listing characteristics matching the search parameters. The search results display method displays the received listing records on the portable computing device.

A further embodiment of the invention is a portable computing device, process, and computer-readable storage medium holding code for providing remote interactive access to a real estate information database. A general purpose random access memory exclusively maintains both program code and data for both transient and persistent storage. A remote client is configured in the general purpose random access memory and includes methods for accessing a real estate information database through a search engine running on a database server. The search engine is configured to retrieve one or more listing records from the real estate information database with each listing record in the real estate information database including a set of characteristics describing an individual real estate property listing. The remote client includes a session manager facilitating a dynamic session between the portable computing device and the database server over a communications link. The session manager identifies the remote client to the database server and manages an interactive search session between the remote client and the search engine. A search method interactively sends to the search engine search parameters including real estate property listing characteristics and receives from the search engine listing records having characteristics matching the search parameters. A display method displays the listing records on the portable computing device.

The present invention facilitates highly portable, interactive access sessions between a portable computing device and a real estate information database, such as an MLS database. The portable computing device can communicate with the real estate information database using a wide range of communication configurations, including a wireless modem, direct dial-up modem, internetwork protocol (IP) modem, and others. A local server could be introduced to continuously transact an access session with the real estate information database and to provide updates to the portable computing device on a regular basis. Similarly, the portable computing device could be configured for automatic update via an express request (pull) or a page (push).

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1A:
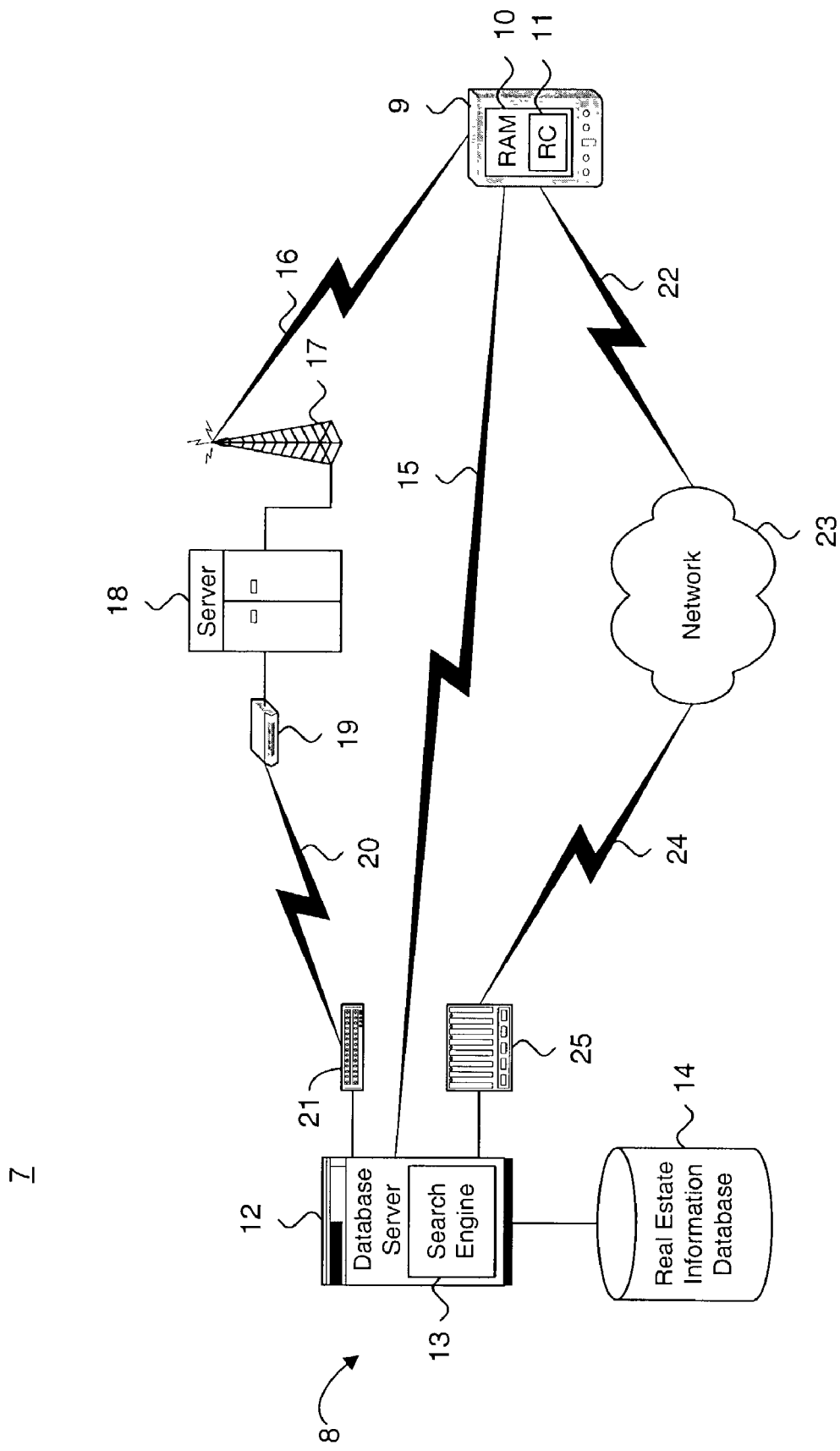
FIGS. 1A and 1B are block diagrams showing a system for transacting retrieval of real estate property listings using a remote client interfaced over an information network in accordance with the present invention.

FIG. 1A is a block diagram showing a system 7 for providing remote interactive access to a real estate information database 14 (database) using a portable computing device (PCD) 9 in accordance with the present invention. There are two principal sets of components: the PCD 9 and a real estate information system 8. The real estate information system 8 includes a database server 12 operatively coupled to the database 14. As further described below, the database server 12 includes a random access memory (RAM) (not shown) into which is loaded and executed a search engine 13. The search engine 13 interfaces to the database 14 for the storage, retrieval, and searching of listing records stored within the database 14. In addition, the database server 12 includes serial ports (not shown), a modem bank 21 and a network hub 25.

As also further described below, the PCD 9 is a special purpose computing device and includes a single general purpose RAM 10 configured for both transient and persistent storage of both program code and data. The RAM 10 is used exclusively by the PCD 9 for both program code and data storage, although the operating system, core libraries, and configuration information could be stored in a specialized read only memory (ROM) (not shown), as is known in the art. A remote client 11 (RC) is loaded and executed in the RAM 11 for interactively accessing the real estate information database 14, as further described below with reference to FIG. 3.

The PCD 9 can be connected to the database server 12 via three types of communications links. First, the PCD 9 can be directly interfaced to a serial port of the database server 12 using a serial connection 15. Second, the PCD 9 can be connected to the database server 12 through a wireless server 18, which is the preferred mode in connection. With this type of communication link, the PCD 9 can be equipped with a wireless modem (not shown) which transmits to a receiver 17 coupled to the wireless server using a radio frequency connection 16. Alternatively, the PCD 9 can be equipped with a conventional modem and an adapter for connection to a cellular telephone. In turn, the wireless server 18 is equipped with a modem 19 that is interconnected with the modem bank 21 via a modem link 20. Finally, the PCD 9 can be connected to the database server 12 via a network 23, such as an internetwork, including the Internet, or an intranetwork. The PCD 9 is connected to the network 23 via a network link 22, which could be via analog modem, internetwork protocol (IP) modem, wireless modem, and the like. In turn, the network 23 is connected to the network hub 25 of the database server 12 via a high speed network link 24.

The database server 12 is a general purpose, programmed digital computing device consisting of a central processing unit (CPU), RAM, nonvolatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage. In the described embodiment, the database server 12 is a legacy-type data processing system consisting of a traditional mainframe computer system, such as manufactured by Tandem Computers, Inc., Cupertino, Calif.

The database system 8 provided by the RE InfoLink Multiple Listing Service, Santa Clara, Calif., is a typical multiple listing service database form. The database 14 includes a set of listing records which each contain a set of characteristics describing the real estate property listing. There are ten classes of properties: single family residential, common interest development, multi residential, mobile homes, residential lots and lands, commercial lots and lands, commercial/industrial, business opportunity, commercial rental, and residential rental. Within each class, a listing record includes various sets of characteristics, including characteristics pertaining to interior, exterior, additional information, including mortgage rate, pricing and tax information, and remarks. Within each of these sets of characteristics, further specifics can be specified, such as, for an interior, type, style, bedrooms, bathrooms, and so on. The database 14 can be searched by specifying these individual characteristics.

The PCD 9 is a special purpose, programmed digital computing device consisting of a CPU, the single general purpose RAM, and limited peripheral devices, including a communications port and user interfacing means, such as a data input interface and display. Typically, these devices are highly portable and are designed for handheld use. The primary difference between a conventional computer system and a PCD is the storage subsystem: to conserve on battery life, size and weight, a single general purpose RAM is used for substantially all program code and data storage, instead of using non-volatile secondary storage. The RAM can include conventional dynamic and static access memory devices, as well as flash memory and related electronic integrated circuit storage technologies, as would be recognized by one skilled in the art. In the described embodiment, the PCD 9 is a personal data assistant (PDA), such as the Palm III connected organizer, or any similar member of the Palm connected organizer family, manufactured by 3Com Corporation, Santa Clara, Calif. An exemplary wireless modem is the Ricochet modem, provided along with the Ricochet mobile Internet access service, by Metricom, Inc., Los Gatos, Calif. An alternate PDA that has in integral wireless modem is the Palm VII connected organizer, also manufactured by 3Com Corporation. A cellular telephone modem adapter suitable for use with a Palm III connected organizer is the Snap-On GSM Modem Adapter, manufactured by Option International, Leuven, Belgium.

The PCD 9 could also be a handheld personal computer (HPC) running the Windows CE operating system, such as the Cassiopeia HPC, manufactured by Casio Computer Company Ltd., Tokyo, Japan; the Compaq Aero 8000 HPC, manufactured by Compaq Computer, Houston, Tex.; and the Jornada HPC, manufactured by the Hewlett-Packard Company, Palo Alto, Calif. Other types of personal computing devices are feasible.

Finally, the PCD 9 could be incorporated as part of the new generation of cellular telephones, known as Smart Phones and similar devices, which integrate the functionality of a PDA with the features of a cellular telephone. The PDQ telephone, manufactured by Qualcomm, San Diego, Calif., in particular incorporates the Palm operating system and connected organizer into a cellular telephone. These types of devices export an application programming interface (API) for interfacing telephony features with client functionality. Thus, the remote client 11 can be loaded and executed using one of these cellular telephones and the database server 12 interactively accessed through the wireless connection afforded by the cellular telephone.

Figure 1B:
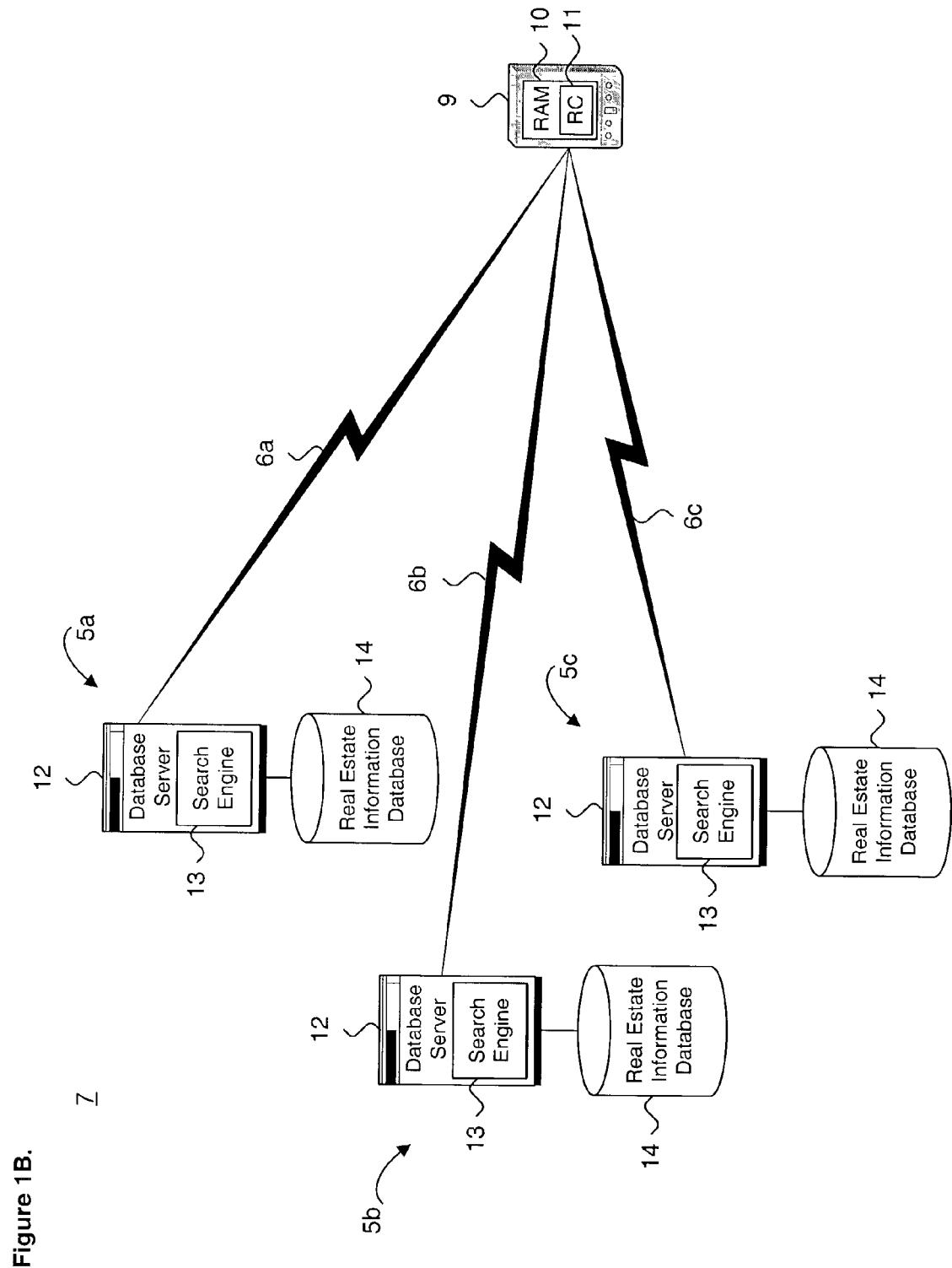

FIG. 1B is a block diagram showing a system 7 for providing remote interactive access to multiple real estate information systems 5a, 5b, 5c using the PCD 9 of FIG. 1A. The PCD 9 can be connected to any number of real estate information systems 5a, 5b, 5c using either the same or different type of communications link 6a, 6b, 6c, respectively. Each communications link 6a, 6b, 6c could be any of the three types of communications links described above with reference to FIG. 1A, that is, a serial connection, a wireless connection, or a network connection, through various protocol configurations of the remote client 11, further described below with reference to FIG. 3. Preferably, the PCD 9 is only connected to one real estate information system 5a, 5b, 5c at one time.

Figure 2:
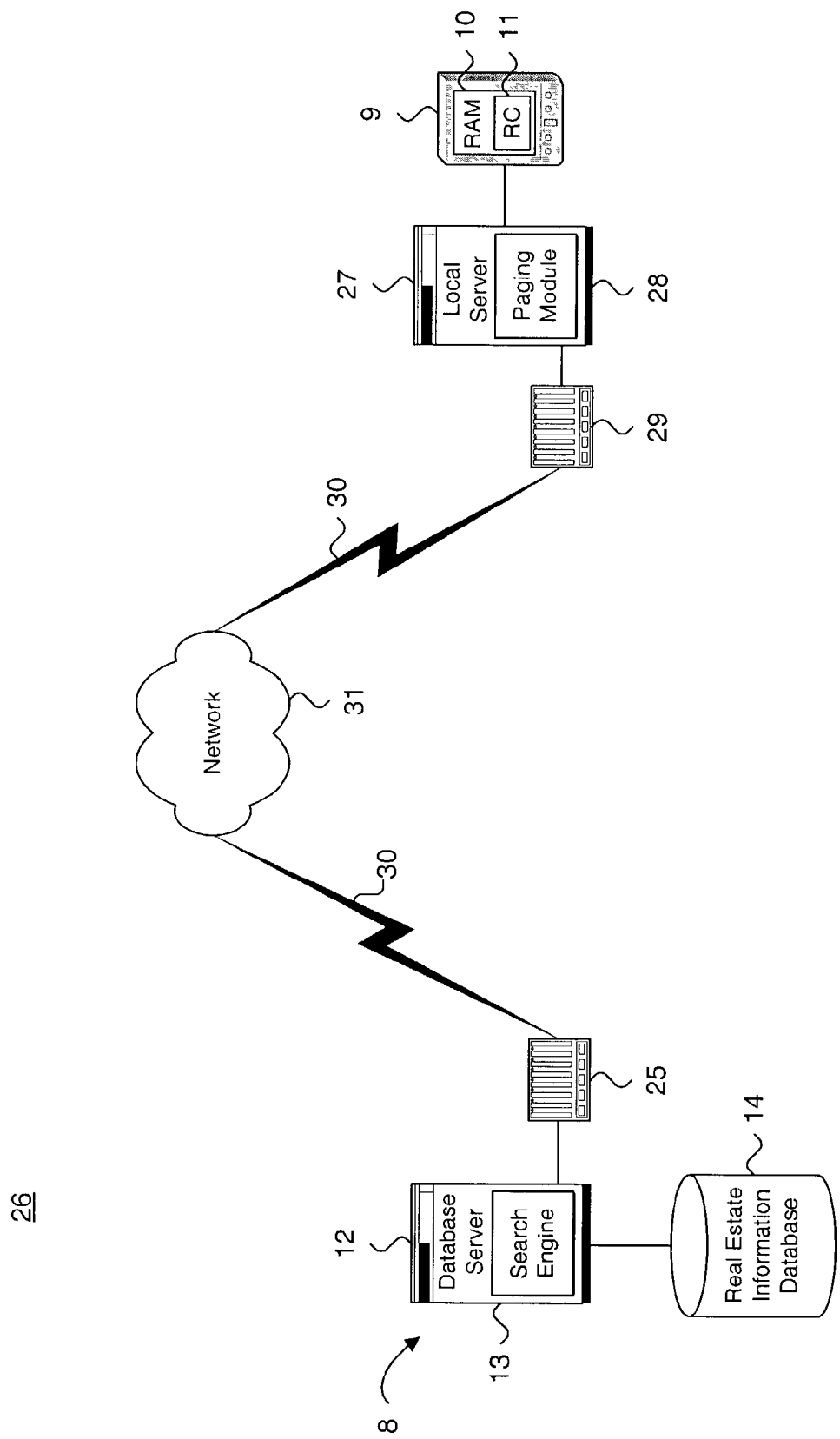
FIG. 2 is a block diagram showing a further embodiment of the present invention introducing a local server into the system of FIG. 1A.

FIG. 2 is a block diagram showing a further embodiment 26 of the present invention introducing a local server 27 into the system 7 of FIG. 1A. The local server includes a network hub 29 and a random access memory (RAM) (not shown) into which is loaded and executed a paging module 28. As further described below with reference to FIG. 13, the paging module 28 provides a "push" notification of a new or changed real estate property listing to a remote PCD 9 on a regularly scheduled basis. The local server 27 and database server 12 are both connected to a network 31 via high speed network link 30 using network hubs 29 and 25, respectively.

Figure 3:
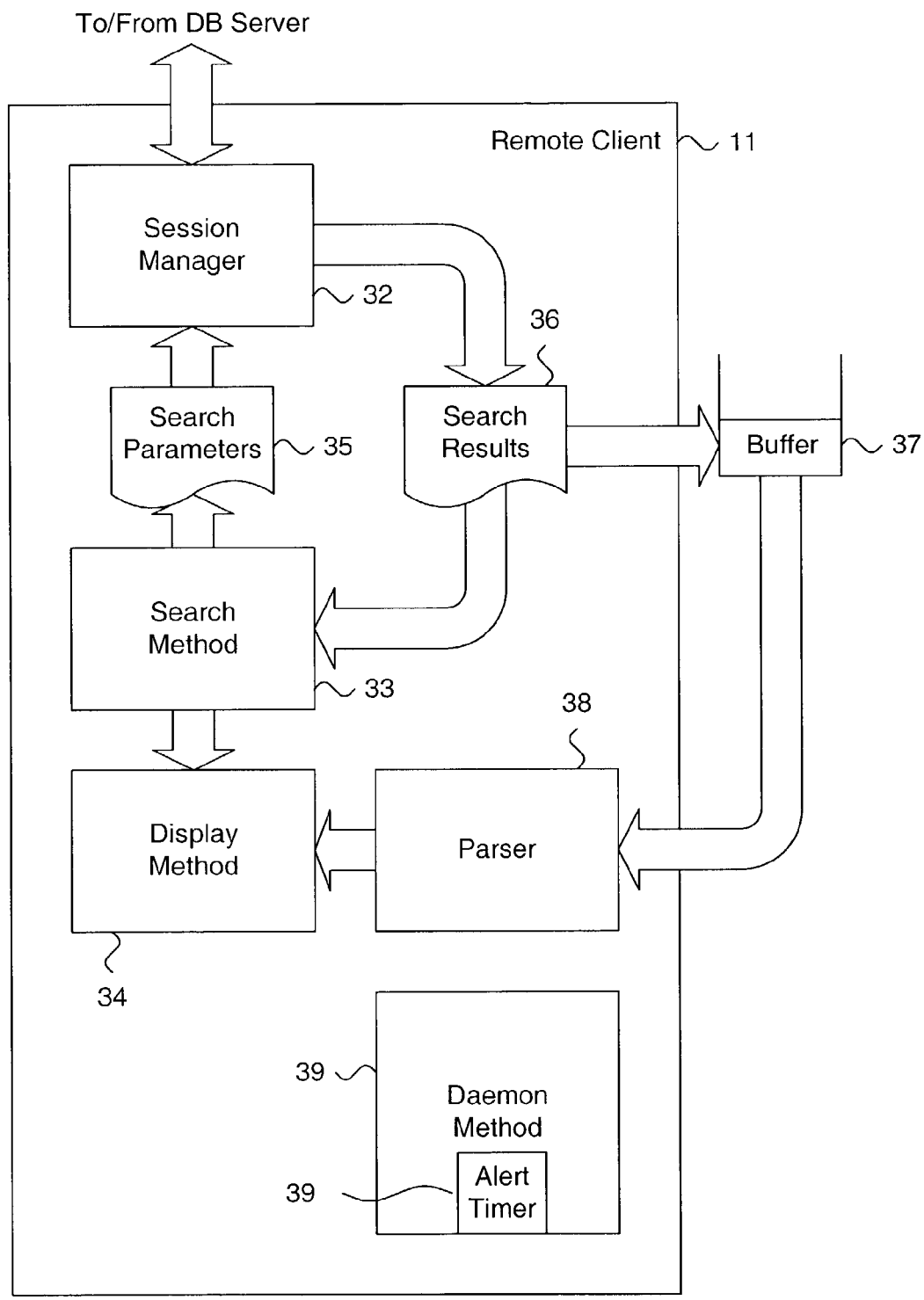
FIG. 3 is a functional block diagram showing the remote client used in the system of FIG. 1A.

FIG. 3 is a functional block diagram showing the remote client 11 used in the system 8 of FIG. 1A. The remote client 11 is a computer program written as source code in a conventional programming language, such as the C or Java programming languages, and is presented for execution by the CPU as object or byte code, as is known in the art. The various implementations of the source code and object and byte codes can be held on a computer-readable storage medium, including the general purpose RAM 10 of the PCD 9, or embodied on a transmission medium in a carrier wave. In the described embodiment, the remote client is written in the C programming language with the Code Warrior C compiler and 3Com Macintosh System Development Kit for the Palm 3.0 operating system.

The remote client 11 consists of three primary modules: session manager 32, search method 33, and display method 34. The session manager 32 provides the low level communications interface to the database server 12, including identifying the remote client 11 and managing an on-going interactive session between the remote client 11 and the search engine 13. The search method 33 processes search queries by sending sets of search parameters 35 to the search engine 13 via the session manager 32. In response, the search method 33 receives back search results 36 in the form of real estate property listing records that the search engine 13 has retrieved from the database 14. Finally, the display method 34 displays the real estate property listing records to the user. The steps performed by the respective modules of the remote client 11 are further described below beginning with reference to FIGS. 4A and 4B.

In one embodiment, the remote client 11 interfaces directly to the search engine 13. The search results 36 are pre-filtered into a format designed for presentation within the limited size of the display of the PCD 9. In an alternate embodiment, the search results 36 are returned in a page display format, such as would be acceptable for viewing on a conventional personal computer display. The session manager 32 stores these search results 36 into a receive buffer 37 configured in the general purpose RAM of the PCD 9. A parser 38 reads in the page display formatted search results from the receive buffer 37 and breaks the search results down into "tokens" for use by the display method 34.

In a further embodiment of the present invention, the remote client 11 includes a daemon method 39 for periodically providing a "pull" notification of a new or changed real estate property listing, as further described below with reference to FIG. 14. An alert timer 40 within the daemon method 39 "wakes up" the PCD 9 and initiates a connection to the database server 12. The search method 33 issues a new query to the search engine 13 and processes any new or changes search results received from the database server 12.

Figure 4A:
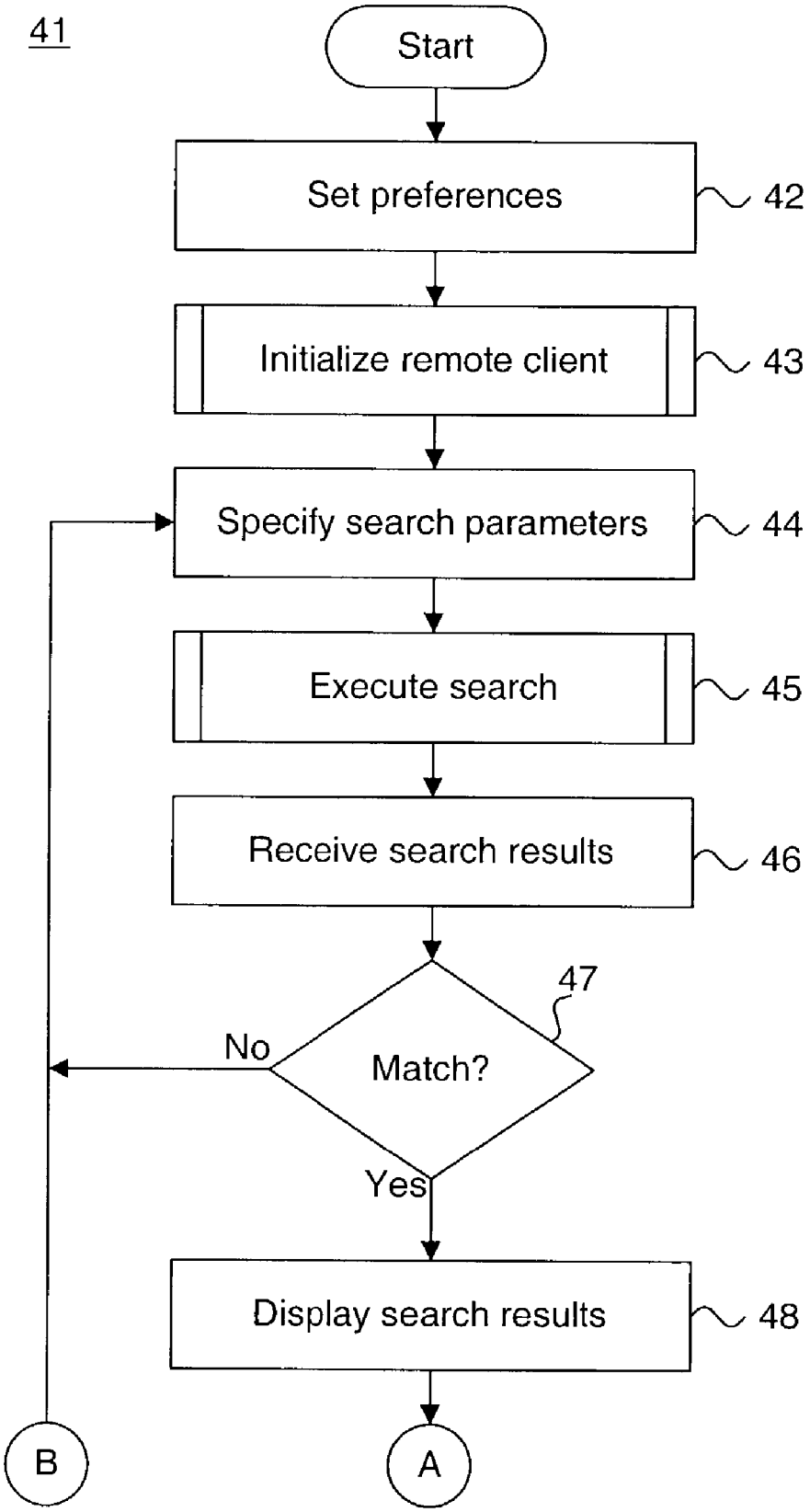
FIGS. 4A and 4B are flow diagrams showing a process for transacting retrieval of real estate property listings using a remote client interfaced over an information network in accordance with the present invention.
Figure 4B:
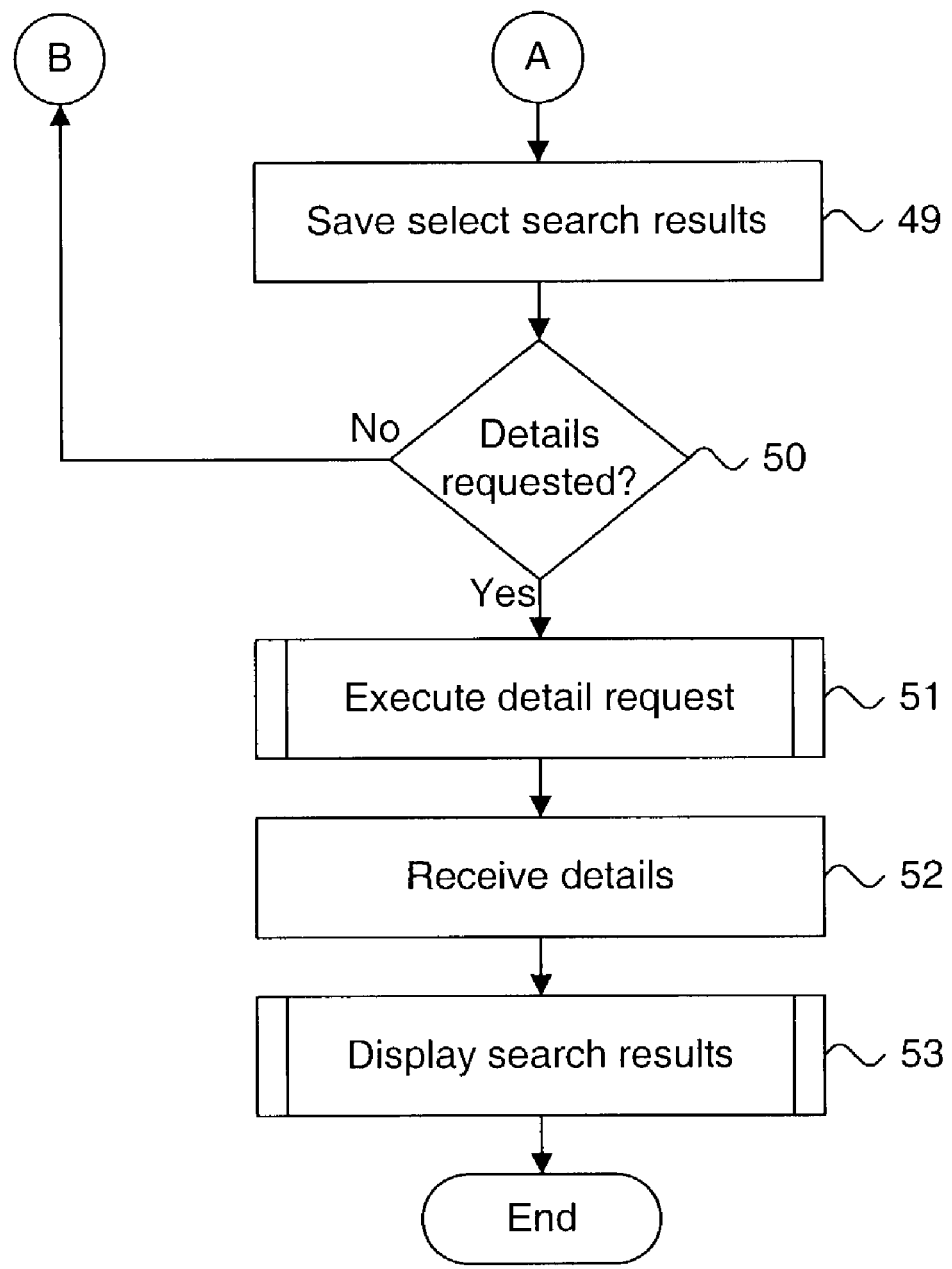
Figure 5:
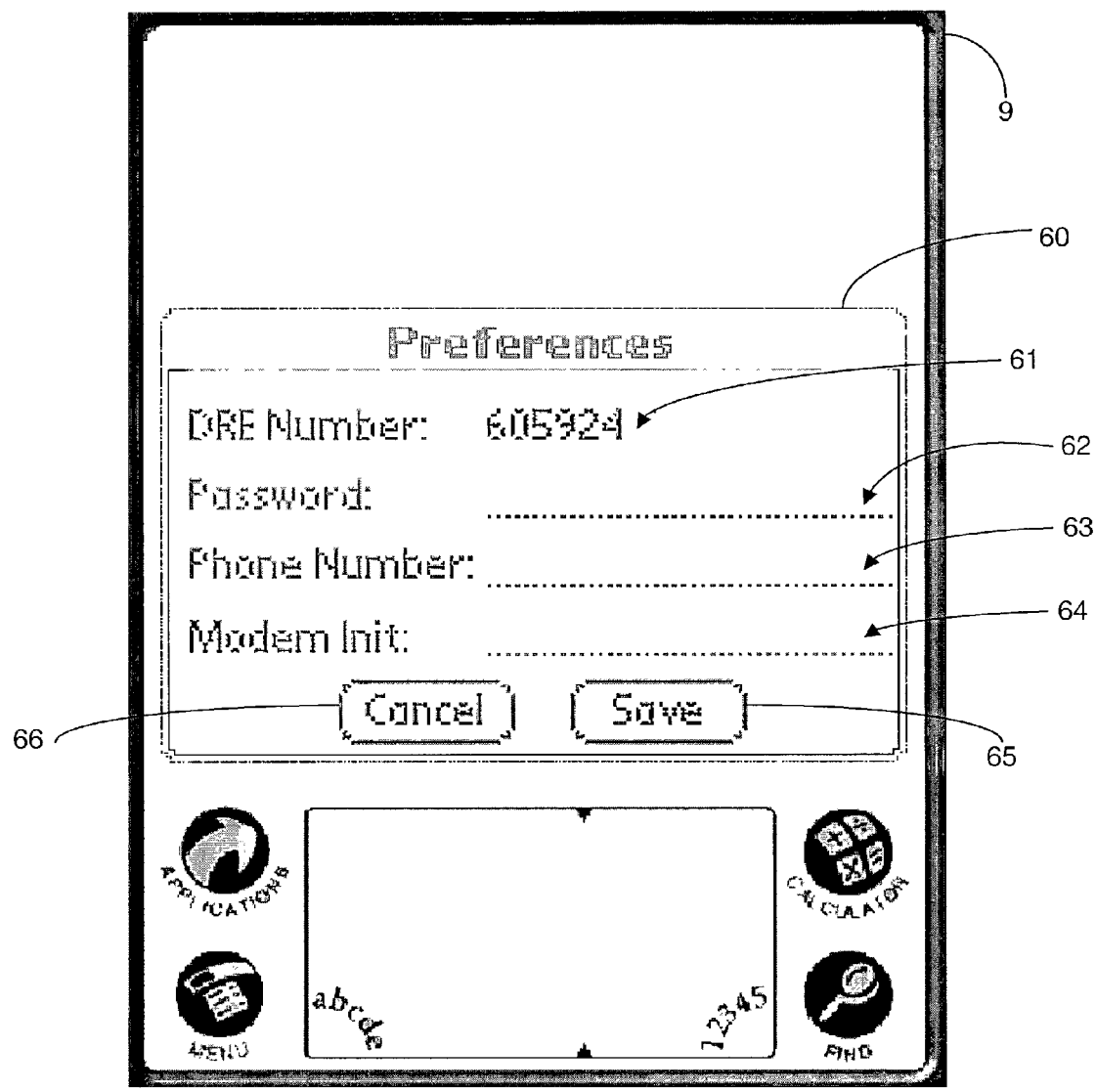
FIG. 5 is a screen shot showing, by way of example, a preferences specification screen generated by the method of FIGS. 4A and 4B.

FIGS. 4A and 4B are flow diagrams showing a process 41 for providing remote interactive access to a real estate information database 14 using a PCD 9 in accordance with the present invention. First, a set of preferences for the interactive session is set (block 42). Referring to FIG. 5, a screen shot of a preferences specification screen 60 generated, by way of example, by the method 41 of FIGS. 4A and 4B is shown. In the described embodiment, four preferences need be specified, a Department of Real Estate (DRE) license number 61, a password 62, a phone number 63 and a modem initialization string 64, although other preferences are also feasible. Upon the completion of the specification of preferences, the preferences can be saved by pressing the virtual "Save" button 65 or discarded by pressing the virtual "Cancel" button 66.

Figure 6A:
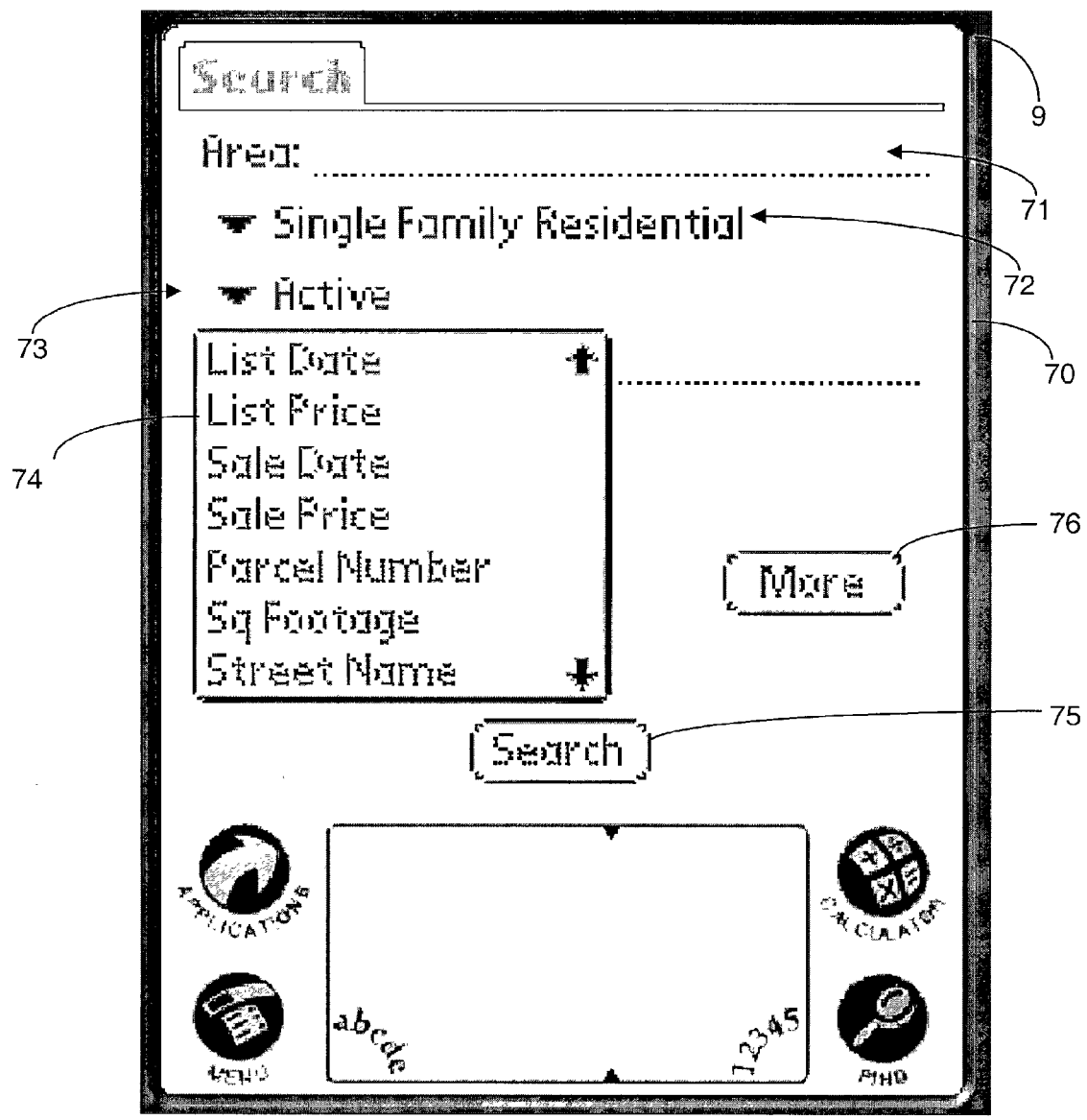
FIGS. 6A and 6B are screen shots showing, by way of example, a search parameter specification screen and a search status screen generated by the method of FIGS. 4A and 4B.
Figure 6B:
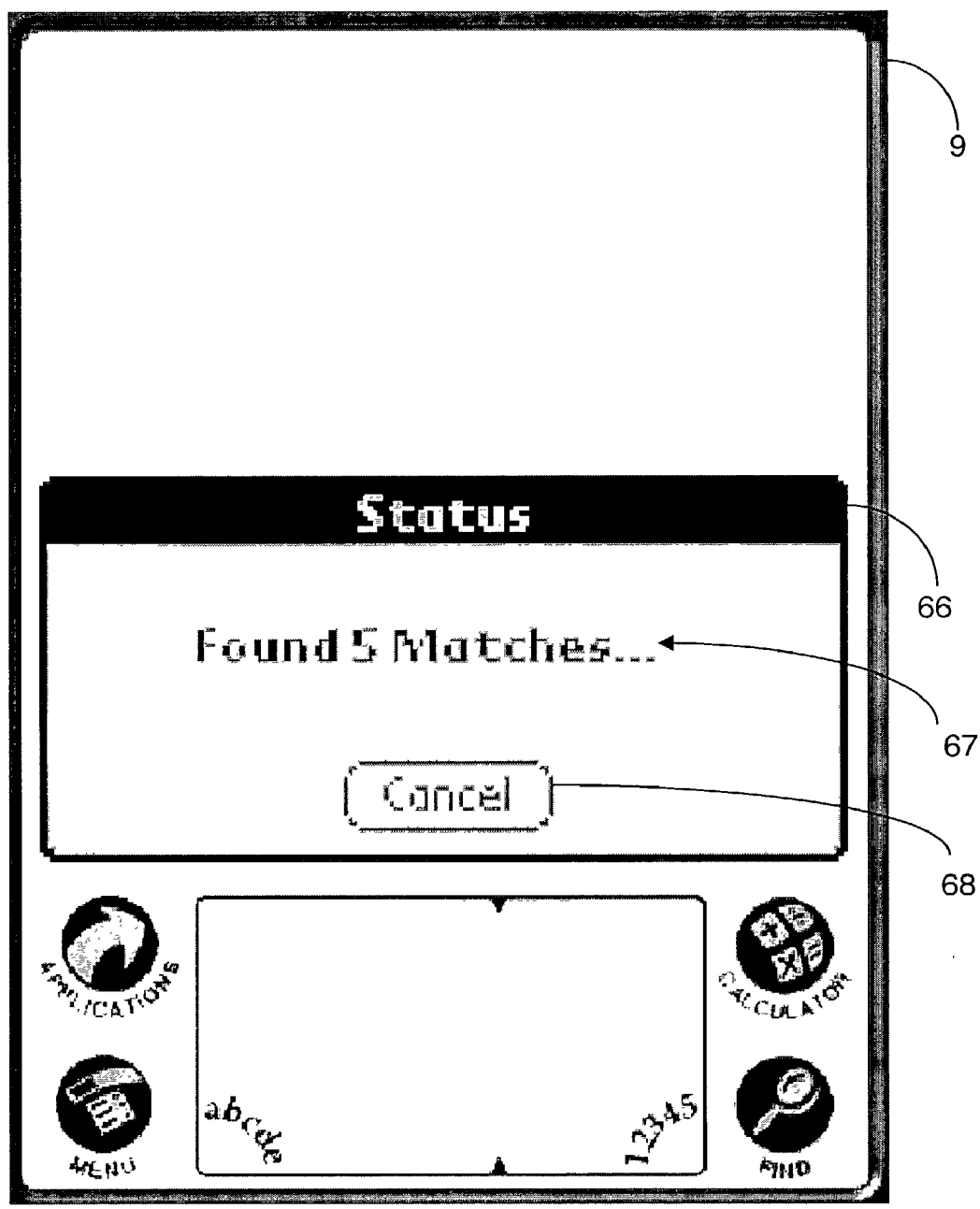

Referring back to FIGS. 4A and 4B, next, the remote client 11 is initialized (block 43) for serial communications by the session manager 32 (shown in FIG. 3) as further described below with reference to FIG. 8. A set of search parameters 35 is specified (block 44) using the search method 33 (shown in FIG. 4). Referring to FIG. 6A, a screen shot of a search parameter specification screen 70 generated, by way of example, by the method 41 of FIGS. 4A and 4B is shown. In the described embodiment, four search parameters need be specified, a search area or neighborhood 71, a class 72, such as "Single Family Residential," the status of the property 73, such as "Active," and a "Search By" characteristics 74. Here, a pull down menu of characteristics 74 is presented. The search parameters 35 correspond to the set of characteristics describing the real estate property listings stored in the database 14. Upon the completion of the specification of search parameter specification, the search can be initiated by pressing the virtual "Search" button 75 or more search parameters specified by pressing the virtual "More" button 76. Referring to FIG. 6B, a screen shot of a search status screen 66 generated, by way of example, by the method 41 of FIGS. 4A and 4B is shown. The number of successful search matches 67 is indicated. The search can be canceled by pressing the virtual "Cancel" button 68.

Figure 7:
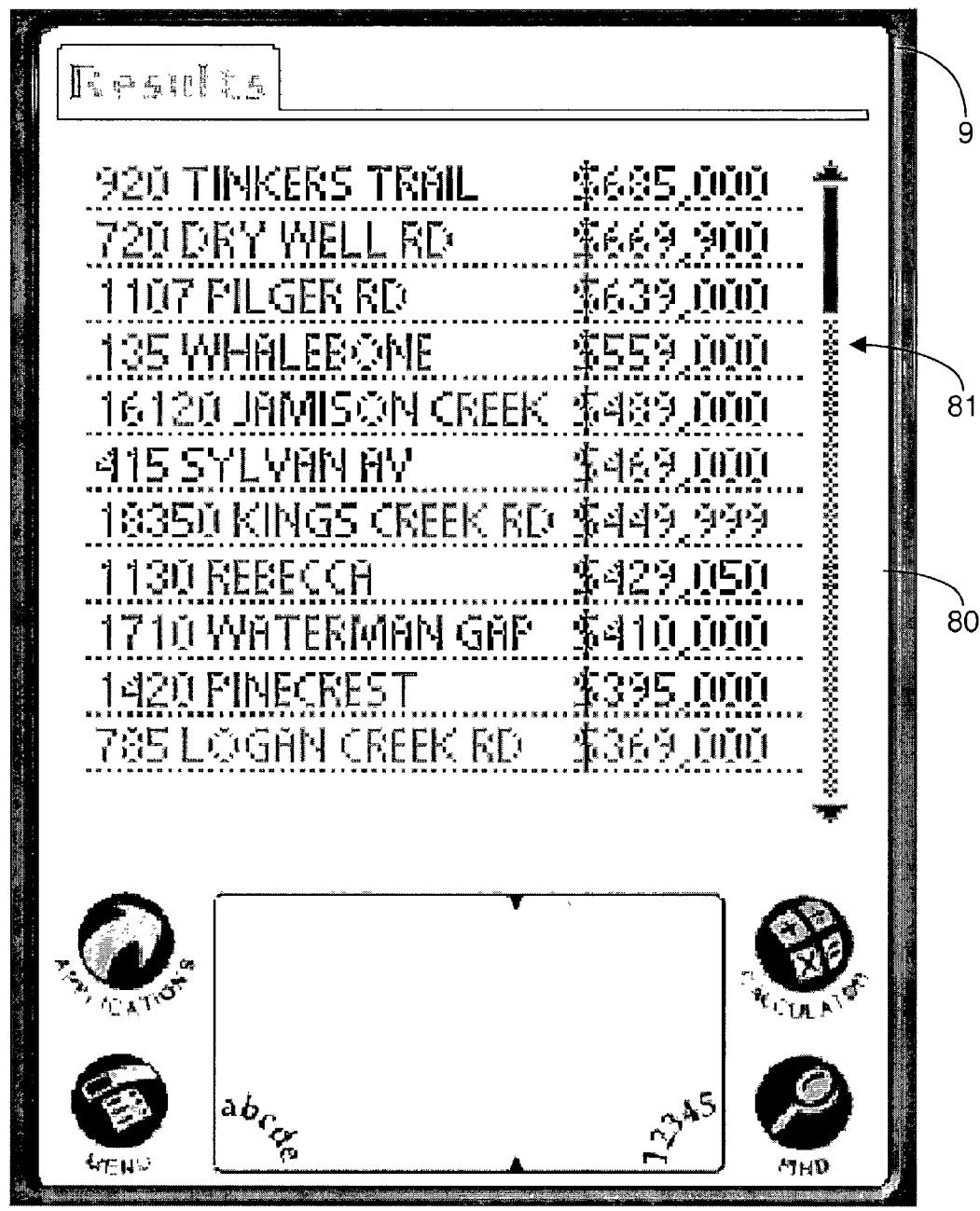
FIG. 7 is a screen shot showing, by way of example, search results screen generated by the method of FIGS. 4A and 4B.

Referring back to FIGS. 4A and 4B, a search is executed (block 45), as further described below with reference to FIG. 7. Search results 36 (shown in FIG. 3) are received (block 46). If the search results 36 indicate a match between the search parameters 35 and one or more listing record in the database 14 (block 47), the search results 36 are displayed (block 48). Referring to FIG. 7, a screen shot of a search results screen 80 generated, by way of example, by the method 41 of FIGS. 4A and 4B is shown. The search results 36 are displayed as a simple list of properties 81.

Referring back to FIGS. 4A and 4B, if there is no match (block 47), further search parameters 35 can be specified (block 44) and the search and review process (blocks 45-47) repeated. Select search results 36 can be saved for later review (block 49) using, for instance, check boxes next to each of the search results 36. If more details of a found property listing are requested (block 50), a detailed search request is executed (block 51), as further described below with reference to FIG. 10. Otherwise, if details are not requested (block 50), a new search can be specified (block 44) and the search and review process (blocks 45-47) repeated. Finally, the detailed search results are received (block 52) and displayed (block 53), as further described below with reference to FIG. 12. The process 41 then ends.

Figure 8:
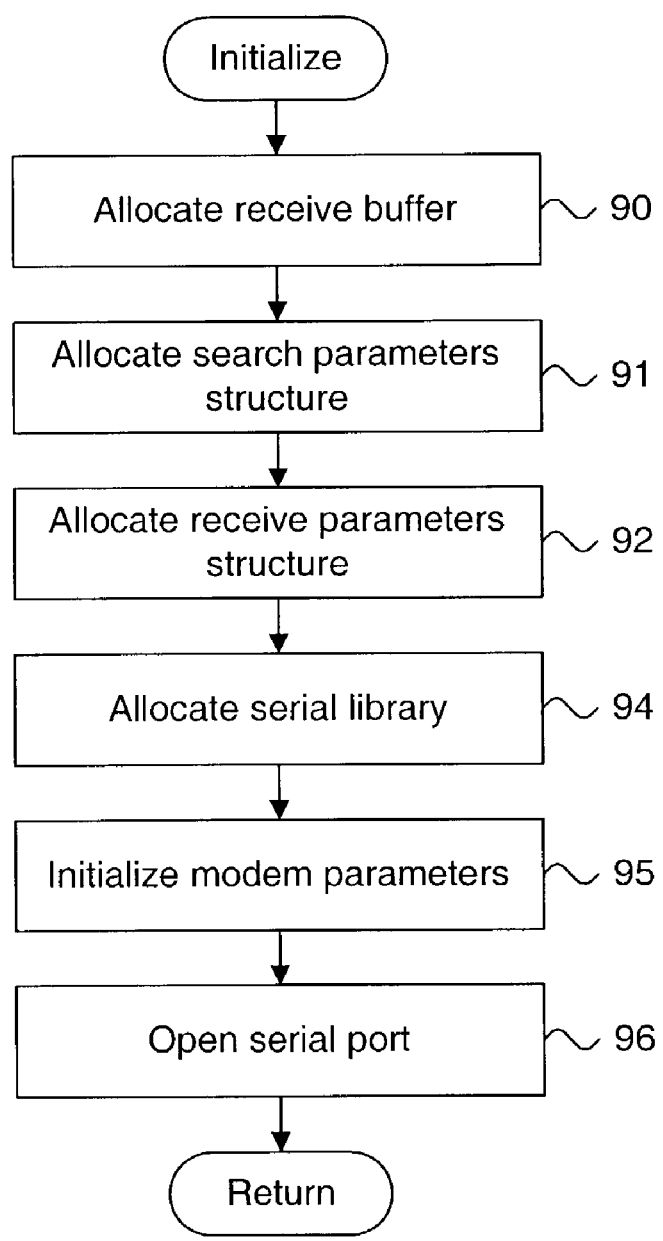
FIG. 8 is a flow diagram showing a routine for initializing a remote client for use in the method of FIGS. 4A and 4B.

FIG. 8 is a flow diagram showing the routine 42 for initializing the remote client 11 for use in the method 41 of FIGS. 4A and 4B. The purpose of this routine is to prepare the session manager 32 for an interactive serial communications session with the database server 12. First, the receive buffer 37 (shown in FIG. 3) is allocated (block 90). A search parameter structure is allocated for storing the search parameters 35 (block 91). A receives parameters structure is allocated for storing the search results 36 (block 92). The receive parameters structure can include a data structure for use in reading page display formatted search results stored in the receive buffer 37. Next, a serial library is allocated (block 94). The modem parameters are initialized (block 95), such as baud rate, data bits, and parity bits. Finally, the serial port is opened (block 96) and a session with the database server 12 is initiated. The routine 42 then returns.

Figure 9:
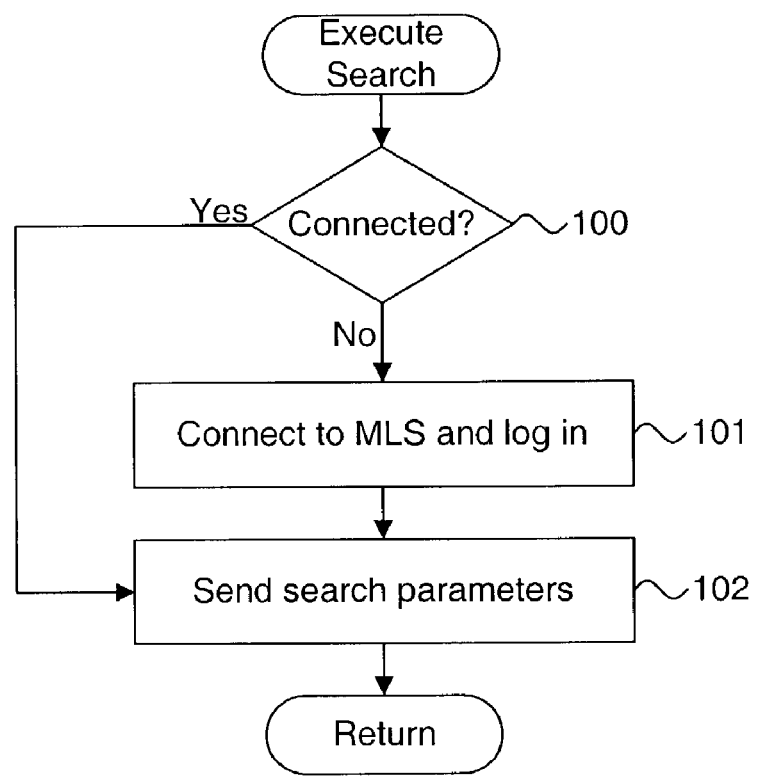
FIG. 9 is a flow diagram showing a routine for executing a search for use in the method of FIGS. 4A and 4B.

FIG. 9 is a flow diagram showing the routine 45 for executing a search for use in the method 41 of FIGS. 4A and 4B. The purpose of this routine is to send the search parameters 35 to the search engine 13. If the remote client 11 is not connected to the database server 12 (block 100), a connection is initiated (block 101). Once connected, the search parameters 35 are sent (block 102). In the described embodiment, the remote client 11 interacts with the search engine 13 in two ways. First, using a modem access proxy, such as via a wireless connection, the search parameters 35 are sent to the search engine 13 as if remote client 11 were a conventional character-based terminal. The search results 36 are returned in a page display format, which is then parsed, into tokens by the parser 38 (shown in FIG. 3). Second, the search method 33 invokes a remote function call to the search engine 13 and the search parameters 35 are sent as function call parameters. For example, a Structured Query Language (SQL) or Extensible Markup Language (XML) function call could be used. Upon completion of the sending of the search parameters 35, the routine 45 returns.

Figure 10:
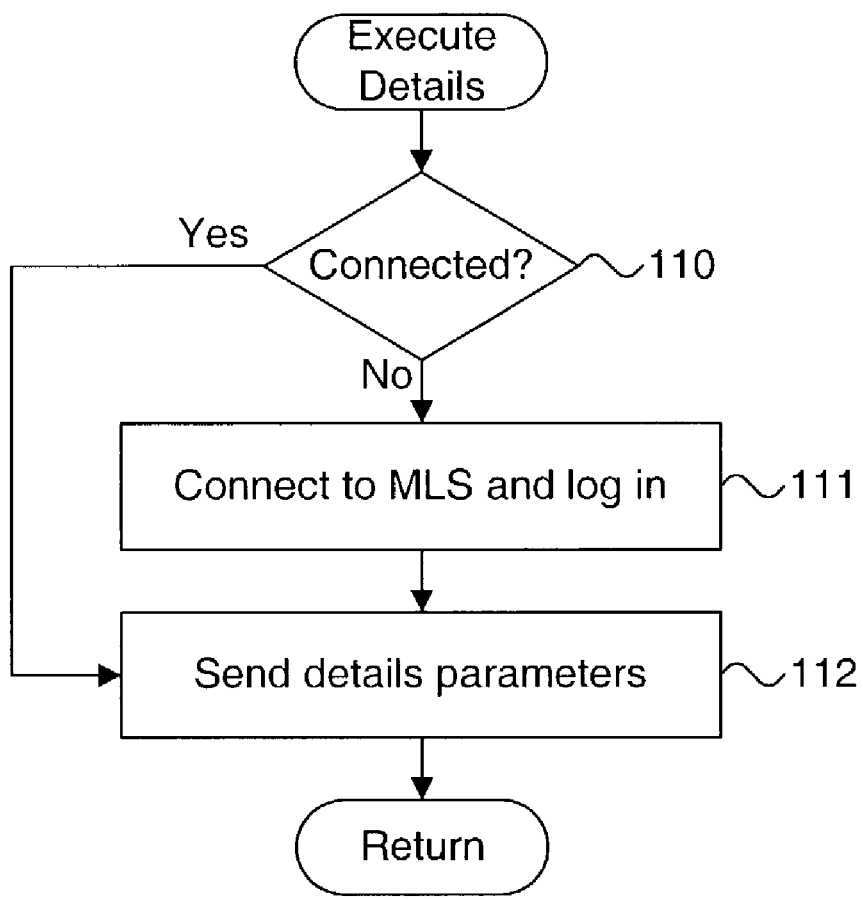
FIG. 10 is a flow diagram showing a routine for executing a detail search for use in the method of FIGS. 4A and 4B.

FIG. 10 is a flow diagram showing the routine 49 for executing a detail search for use in the method 41 of FIGS. 4A and 4B. The purpose of this routine is to send a further request for more detailed information about one or more particular property listings from the set of search results 36. If the remote client 11 is not connected to the database server 12 (block 110), a connection is initiated (block 111). Once connected, detailed search parameters are sent (block 112). In the described embodiment, each listing record describing a real estate property listing in the database 14 includes a unique identifier, called an MLS number. Unique identifiers for particular properties, such as those shown in the example properties list 81 (shown in FIG. 7), are sent to the search engine 12 to retrieve specific detailed information. Upon completion of the sending of the detailed information request, the routine 49 returns.

Figure 11:
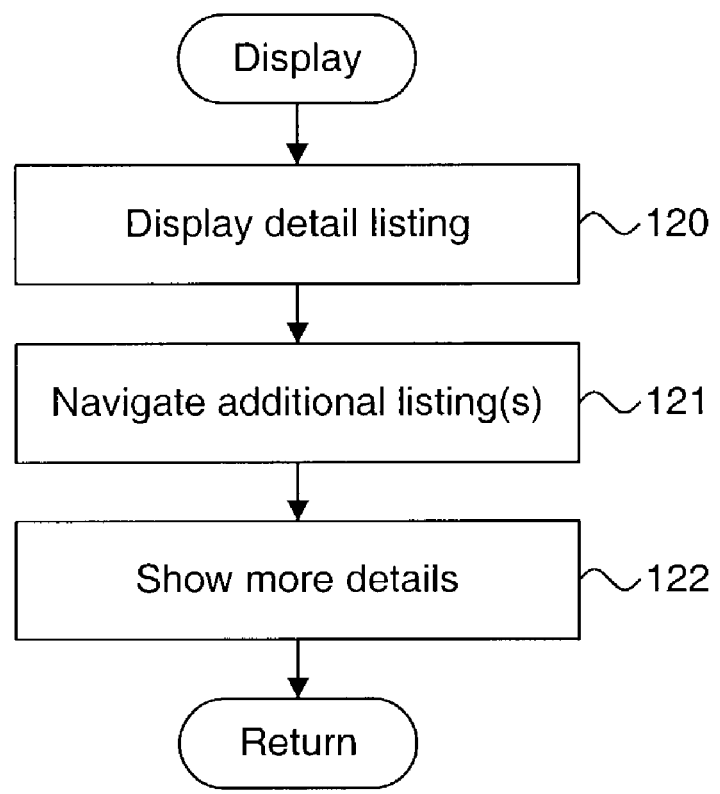
FIG. 11 is a flow diagram showing a routine for displaying detailed search results for use in the method of FIGS. 4A and 4B.
Figure 12A:
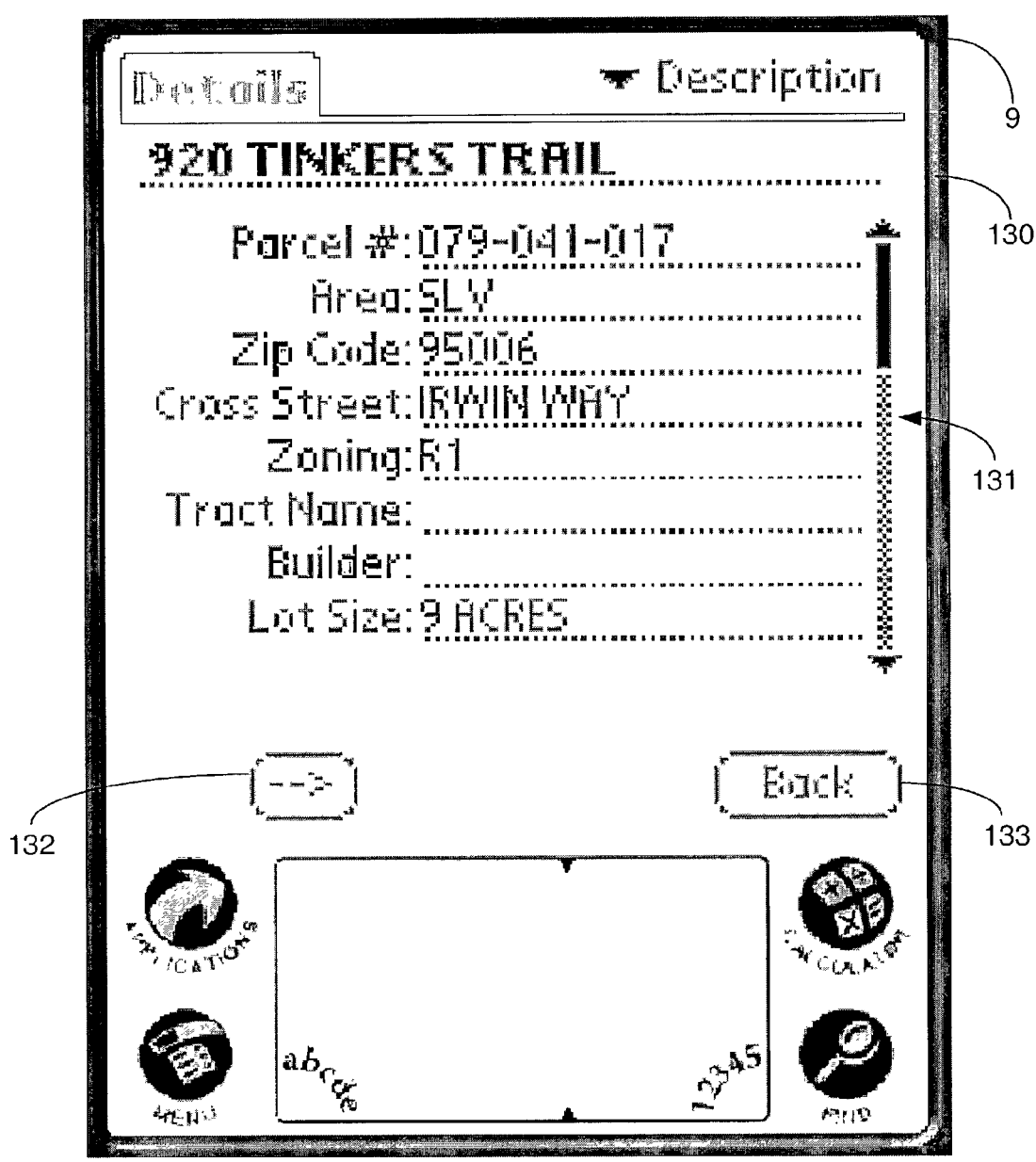
FIGS. 12A-12E are screen shots showing, by way of example, search result details screens generated by the routine of FIG. 11.
Figure 12B:
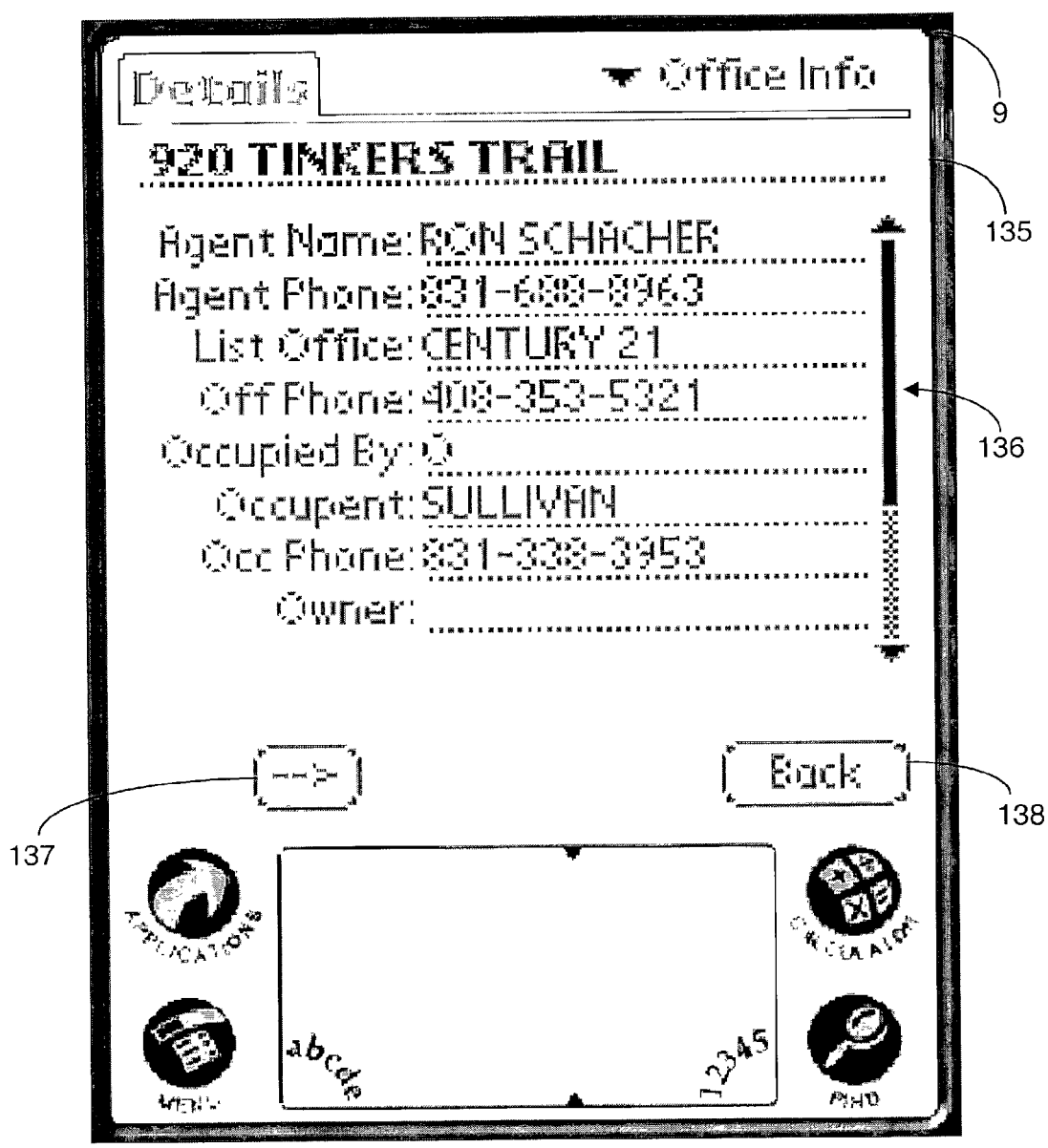
Figure 12C:
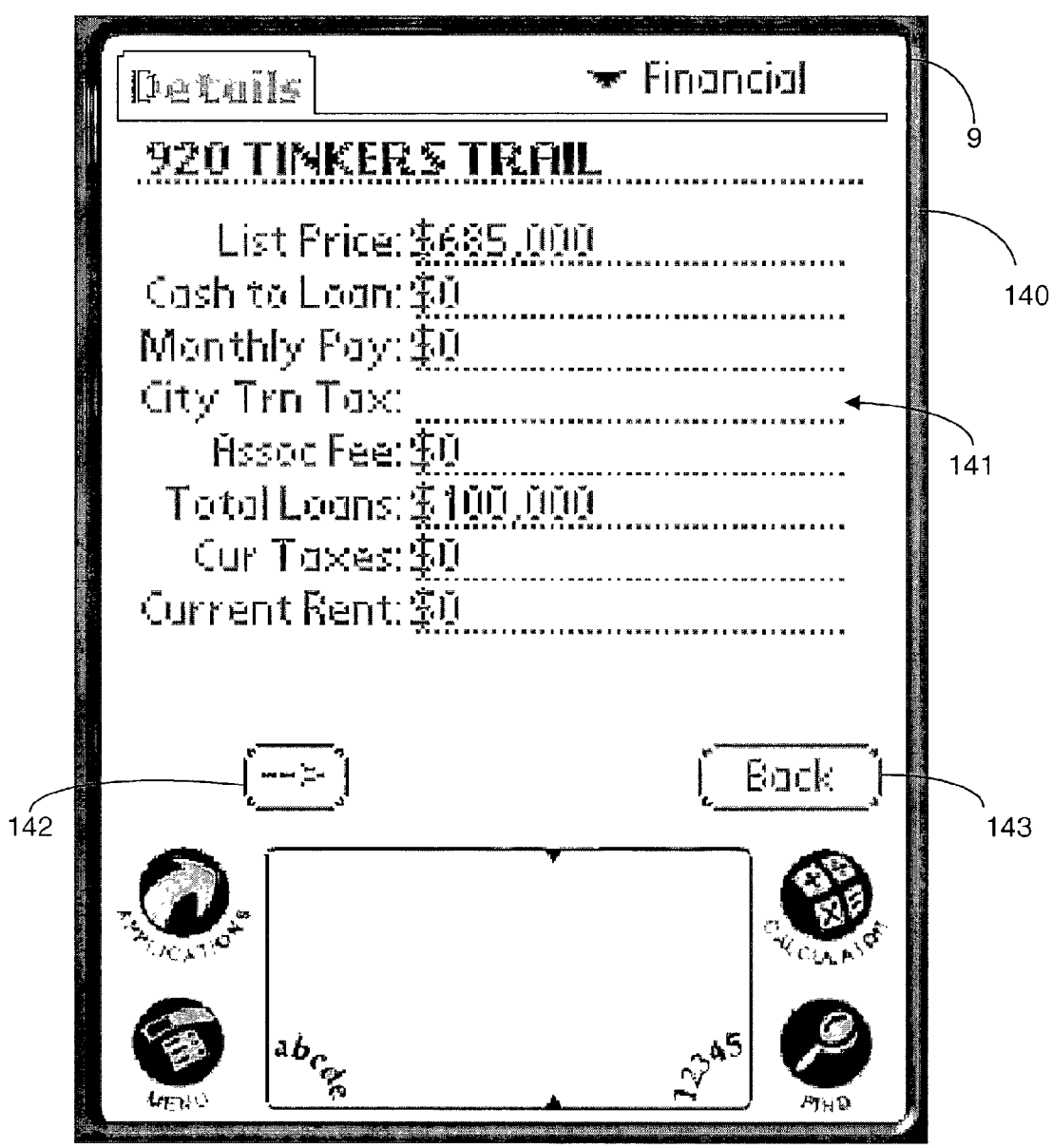
Figure 12D:
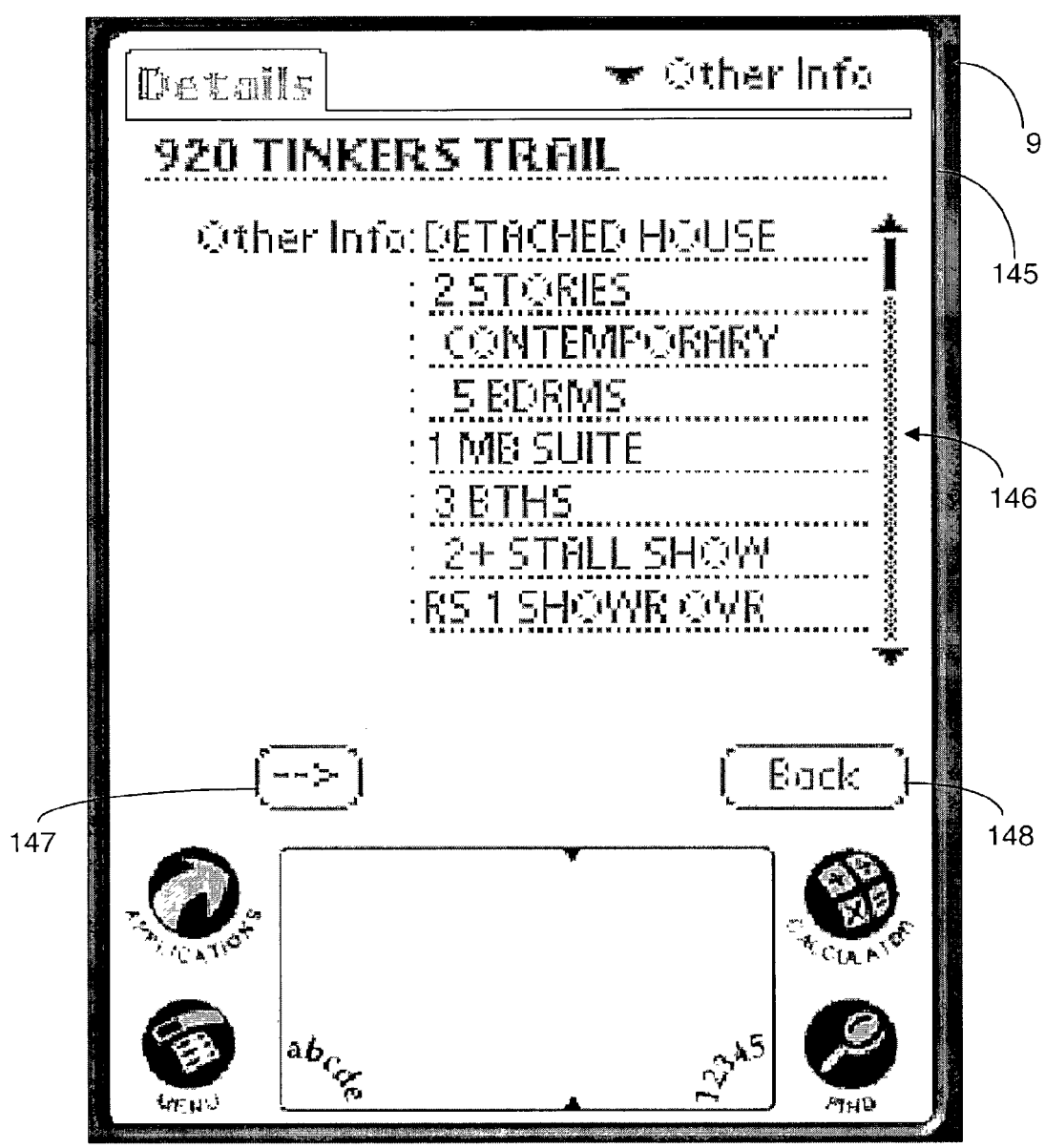
Figure 12E:
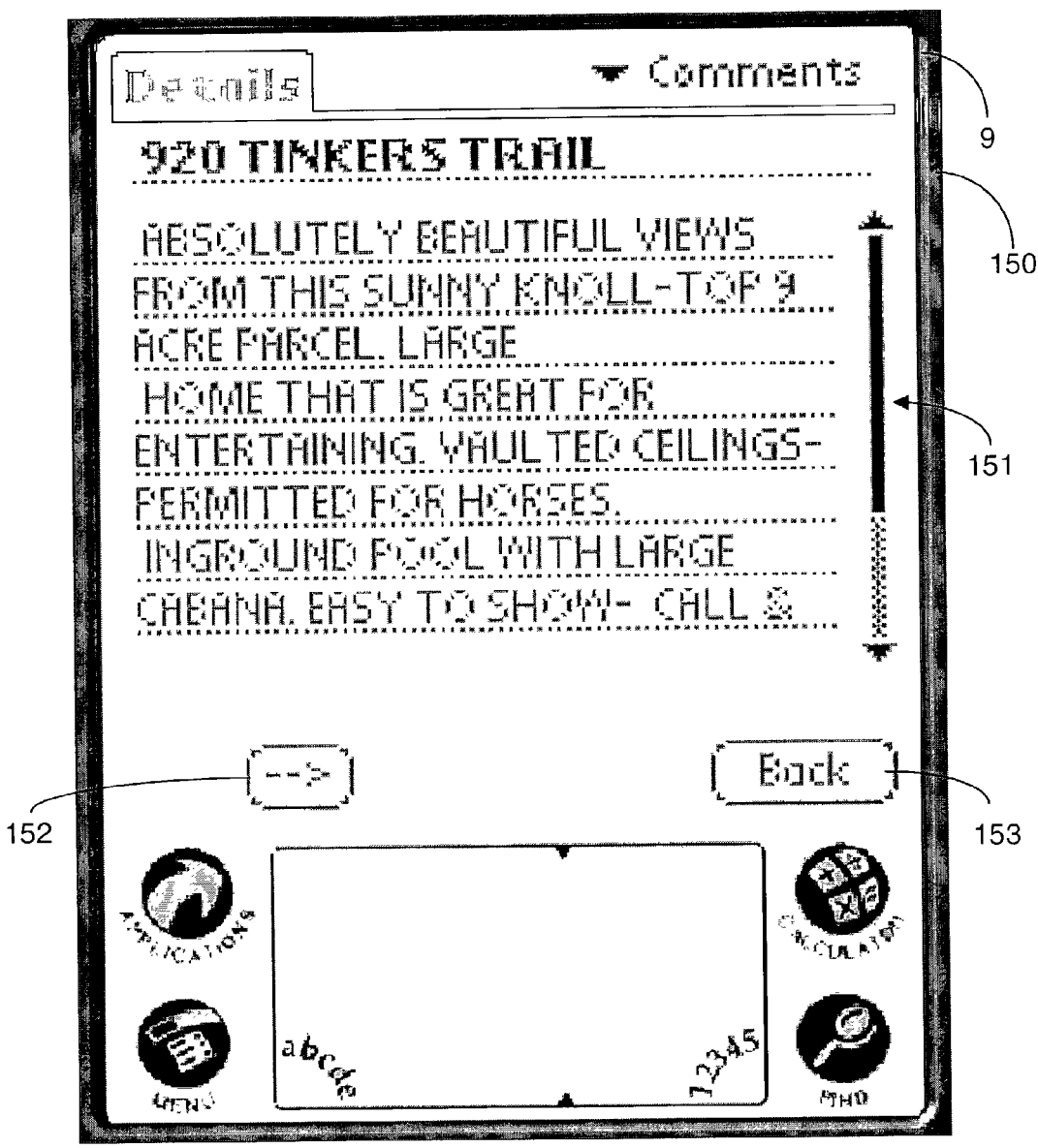

FIG. 11 is a flow diagram showing the routine 51 for displaying detailed search results for use in the method of FIGS. 4A and 4B. The purpose of this routine is to present detailed property listing information in a user-friendly format on the limited display area of the PCD 9. First, the detailed listing is displayed (block 120). Additional listings can be reviewed (block 121) by pressing appropriate navigation virtual buttons. Finally, more detailed information can be shown (block 122). Referring to FIGS. 12A-12E, screen shots showing search result details screens 130, 135, 140, 145, 150 generated by the routine 51 of FIG. 11 are shown. Per screen 130, detailed listing information 131 is presented. Additional property listings can be accessed by pressing the "→" virtual button 132. The previous search screen can be accessed by pressing the "Back" virtual button 133. Per screen 135, office information 136 is presented. Additional property listings can be accessed by pressing the "→" virtual button 137. The previous search screen can be accessed by pressing the "Back" virtual button 138. Per screen 140, financial information 141 is presented. Additional property listings can be accessed by pressing the "→" virtual button 142. The previous search screen can be accessed by pressing the "Back" virtual button 143. Per screen 145, other information 146 is presented. Additional property listings can be accessed by pressing the "→" virtual button 147. The previous search screen can be accessed by pressing the "Back" virtual button 148. Finally, per screen 150, comments 151 are presented. Additional property listings can be accessed by pressing the "→" virtual button 152. The previous search screen can be accessed by pressing the "Back" virtual button 153. Upon completion of the displaying of the detailed information, the routine 51 returns.

Figure 13:
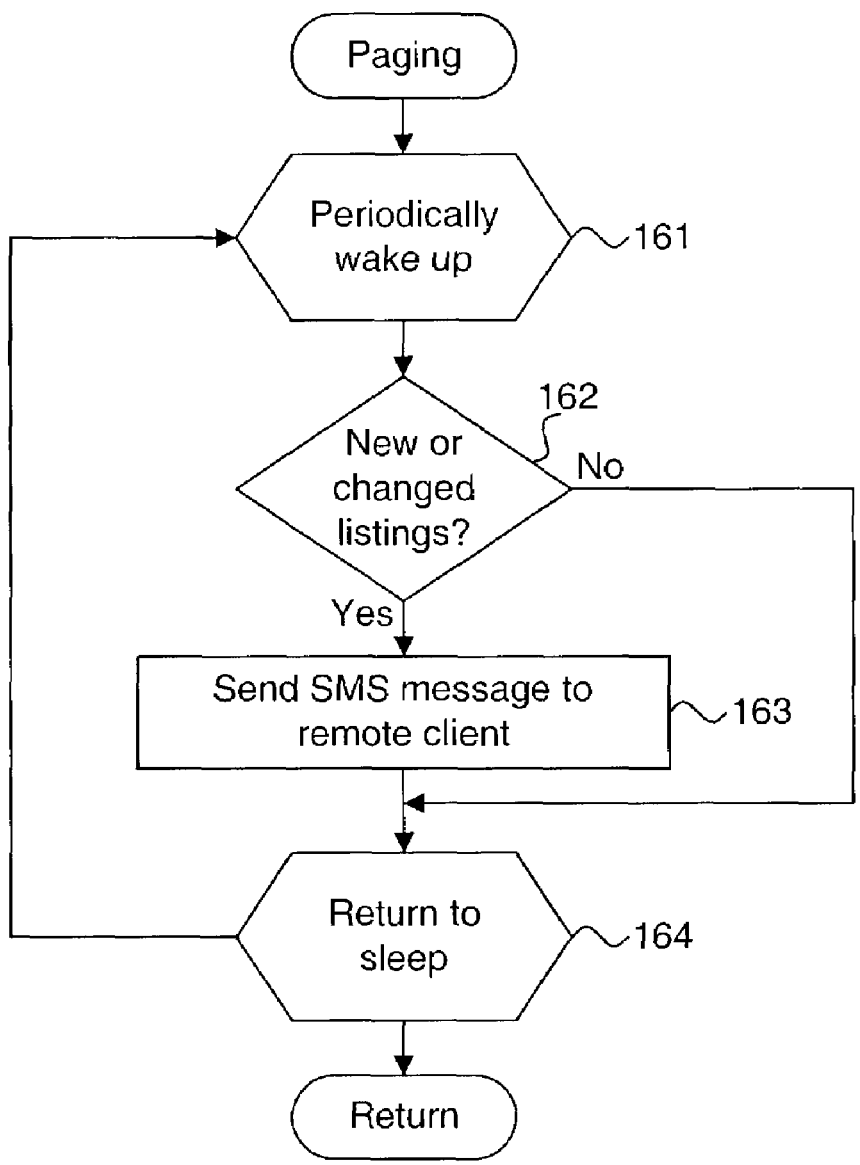
FIG. 13 is a flow diagram showing a routine for a paging module which provides a "push" notification as a further embodiment of the present invention.

FIG. 13 is a flow diagram showing a routine for a paging module 160 which provides a "push" notification as a further embodiment of the present invention. This routine operates in the paging module 28 in the remote server 27 (shown in FIG. 2). The paging module 28 is periodically waken up (block 161) using an internal timer. If there are new or changed listing records in the database 14 (block 162), a Short Messaging Service (SMS) message is sent to the remote client 9 (block 163). SMS messages are short alphanumeric messages limited to around 200 characters. Other messaging technologies could also be used, including the Wireless Markup Language (WML), Wireless Application Protocol (WAP), and other related push-type notification protocols, as would be recognized by one skilled in the art. The method 160 then returns to sleep (block 164) until the next periodic awakening. The sleeping period can be set to any reasonable interval, such as one hour.

Figure 14:
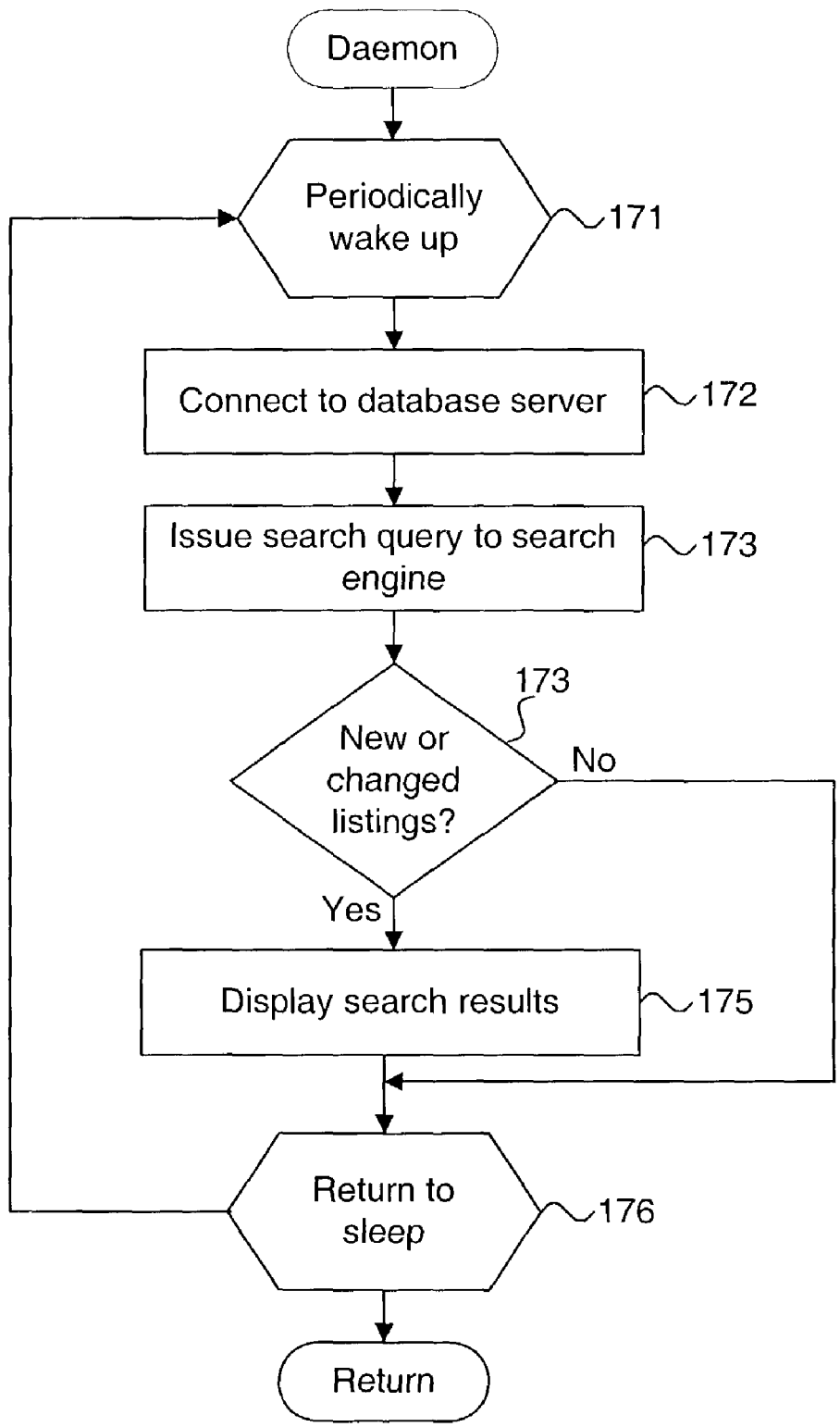
FIG. 14 is a flow diagram showing a routine for a daemon method for periodically providing a "pull" notification as a further embodiment of the present invention.

FIG. 14 is a flow diagram showing a routine for a daemon method 170 for periodically providing a "pull" notification as a further embodiment of the present invention. The remote client 9 is periodically waken up (block 171) using the alert timer 40 (shown in FIG. 3). A connection to the database server 12 is initiated (block 172) and a search query is issued to the search engine 13 (block 173). If there are new or changed listing records in the database 14 (block 174), the search results 36 are received and displayed (block 175). The method 170 then returns to sleep (block 176) until the next periodic awakening. The sleeping period can be set to any reasonable interval, such as one hour.

The present invention provides a highly portable solution to providing remote, interactive access to an real estate information database. This approach provides multiple means of connecting to the real estate information database, including via a direct connection, using a proxy or local server, and via a network connection. In addition, the search method is flexible and provides can interact with the search engine either as a pseudo terminal or using remotely invoked function calls.

Moreover, the present invention is based on a portable computing device which differs from personal computer-based solutions by efficiently relying upon a single primary storage subsystem within which both program code and data are stored and executed. This approach provides the practical benefits of dramatically increased battery life, low weight, and minimal form factor. Moreover, the capability to be integrated into a variety of information and communication appliances, such as intelligent and PDQ cellular telephones.

While the invention has been particularly shown and described as referenced to the embodiments thereof, those skilled in the art will understand that the foregoing and other changes in form and detail may be made therein without departing from the spirit and scope of the invention.

What is claimed is:

1. A system for transacting retrieval of real estate property listings using a portable computing device, comprising:
   a real estate property listing database comprising a set of characteristics describing property listings;
   a portable computing device that maintains a local database comprising at least some of the property listings;
   a server that maintains the real estate property listing database and for managing a dynamic search session on the personal computing device to automatically update the local database, comprising:
      a logical communications link for periodically interfacing the portable computing device with the sewer;
      a search engine for receiving target characteristics at the server;
      a comparison component for identifying those property listings in the real estate property listing database matching the target characteristics; and
      a response component for automatically providing the property listings from the real estate property listing database to the local database; and
   a local server for regularly providing updates to the real estate property listing database to the personal computing device, comprising:
      a session manager for continuously transacting an access session with the server to identify at least one of a new and changed property listing in the real estate property listing database; and
      a paging module for sending a notification of the at least one properly listing to the personal computing device.

2. A system according to claim 1, wherein identification of the property listings is implemented using a query language selected from the list comprising a structured query language and Extensible Markup Language.

3. A system according to claim 1, further comprising:
   a daemon component for periodically interfacing to the portable computing device in a further dynamic search session via the communications link, the search engine identifying additional property listings matching the target characteristics from the real estate property listing database, and the response component making the additional property listings available to the portable computing device.

4. A system according to claim 1, wherein the response component sends the property listings as at least one of an email message, a page, a facsimile, a telephone call, a Short Messaging Service message, and a Multimedia Messaging Service message.

5. A system according to claim 1, further comprising:
a paging component for paging the portable computing device using a push notification selected from the list comprising an email message, a page, a facsimile, a telephone call, the Short Messaging Service, Wireless Application Protocol, Multimedia Messaging Service, Hypertext Transport Protocol, TCP/IP, and Wi-Fi.

6. A system according to claim 1, further comprising:
a plurality of real estate property listing databases storing the property listings.

7. A system according to claim 1, further comprising:
a display for displaying the property listings on the portable computing device in at least one of a pre-filtered format and a page display format.

8. A system according to claim 1, wherein the characteristics comprises at least one of a interior description, type, style, bedrooms, bathrooms, property picture, a map, driving directions, school information, mortgage rate, pricing, tax information, and nearby business information.

9. A method for transacting retrieval of property listings using a portable computing device, comprising:
maintaining on a server a real estate property listing database comprising a set of characteristics describing property listings;
maintaining a local database comprising at least some of the property listings on a portable computing device;
managing a dynamic search session on the personal computing device with the server to automatically update the local database, comprising:
periodically interfacing the portable computing device with the server via a logical communications link;
receiving target characteristics at the server;
identifying those property listings in the real estate property listing database matching the target characteristics; and
automatically providing the property listings from the real estate property listing database to the local database; and
regularly providing updates to the real estate property listing database to the personal computing device from a local server, comprising:
continuously transacting an access session on the local server with the server to identify at least one of a new and changed property listing in the real estate property listing database; and
sending a notification of the at least one property listing to the personal computing device from the local server.

10. A method according to claim 9, further comprising:
implementing identification of the property listings using a query language selected from the list comprising a structured query language and Extensible Markup Language.

11. A method according to claim 9, further comprising:
periodically interfacing to the portable computing device in a further dynamic search session via the communications link;
identifying additional property listings matching the target characteristics from the real estate property listing database; and
making the additional property listings available to the portable computing device.

12. A method according to claim 9, further comprising:
sending the property listings as at least one of an email message, a page, a facsimile, a telephone call, a Short Messaging Service message, and a Multimedia Messaging Service message.

13. A method according to claim 9, further comprising:
paging the portable computing device using a push notification selected from the list comprising an email message, a page, a facsimile, a telephone call, the Short Messaging Service, Wireless Application Protocol, Multimedia Messaging Service, Hypertext Transport Protocol, TCP/IP, and Wi-Fi.

14. A method according to claim 9, further comprising:
storing the property listings in a plurality of real estate property listing databases.

15. A method according to claim 9, further comprising:
displaying the property listings on the portable computing device in at least one of a pre-filtered format and a page display format.

16. A method according to claim 9, wherein the characteristics comprises at least one of a interior description, type, style, bedrooms, bathrooms, property picture, a map, driving directions, school information, mortgage rate, pricing, tax information, and nearby business information.

17. A computer-readable storage medium holding code for performing the method according to claim 9.

18. A system for periodically notifying a portable computing device of real estate property listing updates, comprising:
a real estate property listing database comprising a set of characteristics describing property listings;
a local database comprising at least some of the property listings maintained on a portable computing device;
a server that maintains the real estate property listing database, comprising:
an interface for periodically interfacing with the portable computing device to automatically update the local database in a dynamic search session via a logical communications link when matching property listings are identified;
a search engine for storing target characteristics from the portable computing device;
a comparison component for periodically identifying those property listings matching the target characteristics; and
a response component for automatically providing the property listings from the real estate property listing database to the local database; and
a local server, comprising:
a session manager for continuously transacting an access session with the server to identify at least one of a new and changed property listing in the real estate property listing database; and
a paging module for sending a notification of the at least one property listing to the personal computing device from the local server to regularly provide updates to the real estate property listing database.

19. A system according to claim 18, further comprising:
a compiler for implementing identification of the property listings using a query language selected from the list comprising a structured query language and Extensible Markup Language.

20. A system according to claim 18, wherein the response component sends the property listings as at least one of an email message, a page, a facsimile, a telephone call, a Short Messaging Service message, and a Multimedia Messaging Service message.

21. A system according to claim 18, further comprising:
a paging component for paging the portable computing device using a push notification selected from the list comprising an email message, a page, a facsimile, a telephone call, the Short Messaging Service, Wireless Application Protocol, Multimedia Messaging Service, Hypertext Transport Protocol, TCP/IP, and Wi-Fi.

22. A system according to claim 18, further comprising: a plurality of real estate property listing databases storing the property listings.

23. A system according to claim 18, further comprising: a search method for specifying the target characteristics on the portable computing device.

24. A system according to claim 18, further comprising: a communications interface for forming the communications link using at least one of a wireless network, a telephonic exchange, or a digital data internetwork.

25. A system according to claim 18, further comprising: a display for displaying the property listings on the portable computing device in at least one of a pre-filtered format and a page display format.

26. A system according to claim 18, wherein the characteristics set comprises at least one of a interior description, type, style, bedrooms, bathrooms, property picture, a map, driving directions, school information, mortgage rate, pricing, tax information, and nearby business information.

27. A method for periodically notifying a portable computing device of real estate property listing updates, comprising:
maintaining a real estate property listing database comprising a set of characteristics describing property listings on a server;
maintaining a local database comprising at least some of the property listings on a portable computing device;
storing target characteristics received from the portable computing device;
periodically identifying those property listings matching the target characteristics;
periodically interfacing with the portable computing device to automatically update the local database in a dynamic search session via a logical communications link when matching property listings are identified;
automatically providing the property listings from the real estate property listing database to the local database;
continuously transacting an access session with the server to identify at least one of a new and changed property listing in the real estate property listing database; and
sending a notification of the at least one property listing to the personal computing device from the local server to regularly provide updates to the real estate property listing database.

28. A method according to claim 27, further comprising: implementing identification of the property listings using a query language selected from the list comprising a structured query language and Extensible Markup Language.

29. A method according to claim 27, further comprising: sending the identified property listings as at least one of an email message, a page, a facsimile, a telephone call, a Short Messaging Service message, and a Multimedia Messaging Service message.

30. A method according to claim 27, further comprising: paging the portable computing device using a push notification selected from the list comprising an email message, a page, a facsimile, a telephone call, the Short Messaging Service, Wireless Application Protocol, Multimedia Messaging Service, Hypertext Transport Protocol, TCP/IP, and Wi-Fi.

31. A method according to claim 27, further comprising: storing the property listings in a plurality of real estate property listing databases.

32. A method according to claim 27, further comprising: specifying the target characteristics on the portable computing device.

33. A method according to claim 27, further comprising: forming the communications link using at least one of a wireless network, a telephonic exchange, or a digital data internetwork.

34. A method according to claim 27, further comprising: displaying the identified property listings on the portable computing device in at least one of a pre-filtered format and a page display format.

35. A method according to claim 27, wherein the characteristics set comprises at least one of a interior description, type, style, bedrooms, bathrooms, property picture, a map, driving directions, school information, mortgage rate, pricing, tax information, and nearby business information.

36. A computer-readable storage medium holding code for performing the method according to claim 27.

37. A system for remotely retrieving real estate property listings using a portable computing device, comprising:
a real estate property listing database on a server comprising a set of characteristics describing property listings;
a local database comprising at least some of the property listings on a portable computing device; and
a database module for periodically interfacing to the server to automatically update the local database with the real estate property listing database in dynamic search sessions via a logical communications link, comprising:
a session manager for sending target characteristics from the portable computing device to the server; and
a search method for automatically retrieving those property listings matching the target characteristics from the real estate property listing database to the local database and for receiving a notification of at least one of a new and changed property listing sent as a message from a local server that continuously monitors the real estate property listing database and transacts an access session to regularly provide in the message updates to the real estate property listing database and identify the at least one of a new and changed property listing in the real estate property listing database.

38. A system according to claim 37, wherein the property listings are received from the server as at least one of an email message, a page, a facsimile, a telephone call, a Short Messaging Service message, and a Multimedia Messaging Service message.

39. A system according to claim 37, further comprising: a communications interface for forming the communications link using at least one of a wireless network, a telephonic exchange, or a digital data internetwork.

40. A method for remotely retrieving real estate property listings using a portable computing device, comprising:
maintaining a real estate property listing database on a server comprising a set of characteristics describing property listings;
maintaining a local database comprising at least some of the property listings on a portable computing device;
periodically interfacing to the server to automatically update the local database with the real estate property listing database in dynamic search sessions via a logical communications link, comprising:
sending target characteristics from the portable computing device to the server; and
automatically retrieving those property listings matching the target characteristics from the real estate property listing database to the local database; and
receiving a notification of at least one of a new and changed property listing sent as a message from a local server that continuously monitors the real estate property listing database and transacts an access session to regularly provide in the message updates to the real estate property listing database and identify the at least one of a new and changed property listing in the real estate property listing database.

41. A method according to claim 40, further comprising: receiving the property listings from the server as at least one of an email message, a page, a facsimile, a telephone call, a Short Messaging Service message, and a Multimedia Messaging Service message.

42. A method according to claim 40, further comprising: forming the communications link using at least one of a wireless network, a telephonic exchange, or a digital data internetwork.

43. An apparatus for transacting retrieval of property listings using portable computing means, comprising:
   real estate property listing database means comprising a set of characteristics describing property listings maintained by server means:
   portable computing means configured to periodically interface to the server means in a dynamic search session via logical communications means, comprising:
      local database means comprising at least some of the property listings;
      searching means for receiving target characteristics from the portable computing means;
      comparing means for identifying those property listings matching the target characteristics; and
      responding means for automatically providing the property listings from the real estate property listing database means to the local database means; and
   local server means for regularly providing updates to the real estate property listing database means to the local database means of the personal computing means, comprising:
      access session means for continuously transacting an access session to identify at least one of a new and changed property listing in the real estate property listing database means and
      paging means for sending a notification of the at least one property listing to the personal computing means.

44. An apparatus for periodically notifying portable computing means of real estate property listing updates, comprising:
   real estate property listing database means comprising a set of characteristics describing property listings;
   local database means comprising at least some of the property listings on portable computing means;
   server means that maintains the real estate property listing database means and for periodically interfacing to the portable computing means in a dynamic search session via logical communications means when matching property listings are identified, comprising:
      searching means for storing target characteristics received from the portable computing means;
      comparing means for periodically identifying those property listings matching the target characteristics in the property listing database means; and
      responding means for automatically providing the property listings from the real estate property listing database means to the local database means; and
   local server means, comprising:
      access session means for continuously transacting an access session with the server means to identify at least one of a new and changed property listing; and
      paging means for sending a notification of the at least one property listing to the personal computing means from the local server means to regularly provide updates to the real estate property listing database means.

45. An apparatus for remotely retrieving real estate property listings using a portable computing means, comprising:
   real estate property listing database means on server means comprising a set of characteristics describing property listings;
   local database means comprising at least some of the property listings on portable computing means; and
   database means for periodically interfacing to the server means to automatically update the local database means with the real estate property listing database means in dynamic search sessions via logical communications means, comprising:
      session access means for sending target characteristics from the portable computing means to the server means; and
      searching means for automatically retrieving those property listings matching the target characteristics from the real estate property listing database means to the local database means and for receiving a notification of at least one of a new and changed property listing sent as a message from local server means that continuously monitors the real estate property listing database means and transact an access session to regularly provide in the message updates to the real estate property listing database means and identify the at least one of a new and changed property listing in the real estate property listing database means.

46. An apparatus for retrieval of property listings according to property class, comprising:
   portable computing means;
   real estate property listing database means comprising a set of characteristics describing property listings in at least one property class maintained on database server means:
   local database means maintained on the portable computing means; and
   client means for performing a dynamic session with the database server means, comprising:
      searching means for providing target characteristics comprising at least one such property class to the database server means; and
      session managing means for automatically receiving information identifying and describing those properties among the property listings that meet the target characteristics from the real estate property listing database means into the local database means; and
   updater means for receiving a notification of at least one of a new and changed property listing sent as a message from local server means that continuously monitors the real estate property listing database means and transacts an access session to regularly provide in the message updates to the real estate property listing database means and identify the at least one of a new and changed property listing in the real estate property listing database means.

47. A method for retrieval of property listings according to property class, comprising:
   providing a portable computing device;
   maintaining a real estate property listing database comprising a set of characteristics describing property listings in at least one property class;
   maintaining a local database on the portable computing device;

performing a dynamic session with a database server that maintains the real estate property listing database, comprising:

providing target characteristics comprising at least one such property class to the database server; and automatically receiving information identifying and describing those properties among the property listings that meet the target characteristics from the real estate property listing database into the local database; and receiving a notification of at least one of a new and changed property listing sent as a message from a local server that continuously monitors the real estate property listing database and transacts an access session to regularly provide in the message updates to the real estate property listing database and identify the at least one of a new and changed property listing in the real estate property listing database.

48. An apparatus according to claim 46, each property class comprising at least one of single family residential, common interest development, multi residential, mobile homes, residential lots and lands, commercial lots and lands, commercial/industrial, business opportunity, commercial rental, and residential rental.

49. A method according to claim 47, each property class comprising at least one of single family residential, common interest development, multi residential, mobile homes, residential lots and lands, commercial lots and lands, commercial/industrial, business opportunity, commercial rental, and residential rental.

* * * * *

UNITED STATES PATENT AND TRADEMARK OFFICE
CERTIFICATE OF CORRECTION

PATENT NO. : 7,430,555 B2  
APPLICATION NO. : 10/243259  
DATED : September 30, 2008  
INVENTOR(S) : Sealand et al.

Page 1 of 1

It is certified that error appears in the above-identified patent and that said Letters Patent is hereby corrected as shown below:

Column 10,  
Line 32, replace "sewer" with -- server --;  
Line 49, replace "properly" with -- property --.

Column 15,  
Line 18, "tained by server means:" should read -- tained by server means; --;  
Line 38, "listing database means and" should read -- listing database means; and --.

Column 16,  
Line 36, "one property class maintained on database server means:" should read -- one property class maintained on database server means; --.

Signed and Sealed this

Twenty-fifth Day of November, 2008

JON W. DUDAS  
*Director of the United States Patent and Trademark Office*